US008279963B2

(12) United States Patent
Lee et al.

(10) Patent No.: US 8,279,963 B2
(45) Date of Patent: Oct. 2, 2012

(54) DATA SYMBOL MAPPING FOR MULTIPLE-INPUT MULTIPLE-OUTPUT HYBRID AUTOMATIC REPEAT REQUEST

(75) Inventors: Jungwon Lee, Cupertino, CA (US); Bhaskar V. Nallapureddy, Sunnyvale, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 784 days.

(21) Appl. No.: 12/410,044

(22) Filed: Mar. 24, 2009

(65) Prior Publication Data

US 2009/0262855 A1   Oct. 22, 2009

Related U.S. Application Data

(60) Provisional application No. 61/046,934, filed on Apr. 22, 2008.

(51) Int. Cl.
*H04B 7/02* (2006.01)
*H04L 27/00* (2006.01)
*H04L 27/28* (2006.01)

(52) U.S. Cl. .................. 375/267; 375/295; 375/316

(58) Field of Classification Search .......... 375/260–261, 375/267–268, 295, 298, 316, 320, 324; 370/203–204, 206, 208, 280, 295, 298, 302, 370/330, 343, 436, 480–481
See application file for complete search history.

(56) References Cited

U.S. PATENT DOCUMENTS 7,050,510 B2 *    5/2006  Foschini et al. ............... 375/299
2004/0057530 A1 *  3/2004  Tarokh et al. .................. 375/267

FOREIGN PATENT DOCUMENTS

WO    WO 2005/096531    10/2005
WO    WO 2007/149049    12/2007

OTHER PUBLICATIONS

Alex et al., "Performance Evaluation of MIMO in IEEE802.16e/WiMAX" IEEE Journal of Selected Topics in Signal Processing, IEEE, US, vol. 2, No. 2, Apr. 1, 2008, pp. 181-190.
Notification of Transmittal of the International Search Report and the Written Opinion of the International Searching Authority, or the Declaration dated Sep. 24, 2009 in reference to PCT/US2009/041081 (25 pgs).

(Continued)

*Primary Examiner* — Lawrence B Williams

(57) ABSTRACT

A system includes an encoding module, a symbol selection module, a subcarrier selection module, and a mapping module. The encoding module receives symbols for transmission over K subcarriers and T antennas, encodes the symbols using a space time code, and generates space time coded (STC) versions of the symbols, where K and T are integers greater than 1. The symbol selection module selects T adjacent ones of the symbols and selects STC versions of the T adjacent ones of the symbols. The subcarrier selection module selects one of the K subcarriers for transmitting the T adjacent ones of the symbols and the STC versions of the T adjacent ones of the symbols. The mapping module maps the T adjacent ones of the symbols onto the T antennas for transmission over the selected one of the K subcarriers, respectively, and maps the STC versions of the T adjacent ones of the symbols onto the T antennas for transmission over the selected one of the K subcarriers.

19 Claims, 18 Drawing Sheets

OTHER PUBLICATIONS

Zhang et al., "Space-Time/Frequency Coding for MIMO-OFDM in Next Generation Broadband Wireless Systems" IEEE Wireless Communications, vol. 14, No. 3, Jun. 1, 2007, pp. 32-43.

A Simple Scalable Space-Frequency Coding Scheme for MIMO-OFDM; Hemanth Sampath, et al.; Oct. 15, 2004; 5 pages.

Mobile WiMAX—Part 1: A Technical Overview and Performance Evaluation; WiMAX Forum; Aug. 2006; 53 pages.

Symbol Vector Interleaving for Chase-Combining HARQ; Yakun Sun & Jungwon Lee; Marvell Semiconductor, Inc.; Jul. 7, 2007; 7 pages.

IEEE 802.16™-2004 (Revision of IEEE Std 802.16-2001); IEEE Standard for Local and metropolitan area networks; Part 16: Air Interface for Fixed and Broadband Wireless Access Systems; IEEE Computer Society and the IEEE Microwave Theory and Techniques Society; Oct. 1, 2004; 893 pages.

* cited by examiner

STTD (Matrix A), 2 antennas

|  | Antenna 0 | | Antenna 1 | |
| --- | --- | --- | --- | --- |
|  | Even Symbol | Odd Symbol | Even Symbol | Odd Symbol |
| Subcarrier 0 | $s_0$ | $-s_{24}^*$ | $s_{24}$ | $s_0^*$ |
| Subcarrier 1 | $s_1$ | $-s_{25}^*$ | $s_{25}$ | $s_1^*$ |
| Subcarrier 2 | $s_2$ | $-s_{26}^*$ | $s_{26}$ | $s_2^*$ |
| Subcarrier 3 | $s_3$ | $-s_{27}^*$ | $s_{27}$ | $s_3^*$ |
| Subcarrier 4 | $s_4$ | $-s_{28}^*$ | $s_{28}$ | $s_4^*$ |
| Subcarrier 5 | $s_5$ | $-s_{29}^*$ | $s_{29}$ | $s_5^*$ |
| Subcarrier 6 | $s_6$ | $-s_{30}^*$ | $s_{30}$ | $s_6^*$ |
| Subcarrier 7 | $s_7$ | $-s_{31}^*$ | $s_{31}$ | $s_7^*$ |
| Subcarrier 8 | $s_8$ | $-s_{32}^*$ | $s_{32}$ | $s_8^*$ |
| Subcarrier 9 | $s_9$ | $-s_{33}^*$ | $s_{33}$ | $s_9^*$ |
| Subcarrier 10 | $s_{10}$ | $-s_{34}^*$ | $s_{34}$ | $s_{10}^*$ |
| Subcarrier 11 | $s_{11}$ | $-s_{35}^*$ | $s_{35}$ | $s_{11}^*$ |
| Subcarrier 12 | $s_{12}$ | $-s_{36}^*$ | $s_{36}$ | $s_{12}^*$ |
| Subcarrier 13 | $s_{13}$ | $-s_{37}^*$ | $s_{37}$ | $s_{13}^*$ |

FIG. 1A

STTD (Matrix A), 2 antennas (continued)

| Subcarrier 14 | $s_{14}$ | $-s_{38}^*$ | $s_{38}$ | $s_{14}^*$ |
|---|---|---|---|---|
| Subcarrier 15 | $s_{15}$ | $-s_{39}^*$ | $s_{39}$ | $s_{15}^*$ |
| Subcarrier 16 | $s_{16}$ | $-s_{40}^*$ | $s_{40}$ | $s_{16}^*$ |
| Subcarrier 17 | $s_{17}$ | $-s_{41}^*$ | $s_{41}$ | $s_{17}^*$ |
| Subcarrier 18 | $s_{18}$ | $-s_{42}^*$ | $s_{42}$ | $s_{18}^*$ |
| Subcarrier 19 | $s_{19}$ | $-s_{43}^*$ | $s_{43}$ | $s_{19}^*$ |
| Subcarrier 20 | $s_{20}$ | $-s_{44}^*$ | $s_{44}$ | $s_{20}^*$ |
| Subcarrier 21 | $s_{21}$ | $-s_{45}^*$ | $s_{45}$ | $s_{21}^*$ |
| Subcarrier 22 | $s_{22}$ | $-s_{46}^*$ | $s_{46}$ | $s_{22}^*$ |
| Subcarrier 23 | $s_{23}$ | $-s_{47}^*$ | $s_{47}$ | $s_{23}^*$ |

FIG. 1B

SM (Matrix B), 2 antennas

| | Antenna 0 | | Antenna 1 | |
|---|---|---|---|---|
| | Even Symbol | Odd Symbol | Even Symbol | Odd Symbol |
| Subcarrier 0 | $s_0$ | $s_{48}$ | $s_1$ | $s_{49}$ |
| Subcarrier 1 | $s_2$ | $s_{50}$ | $s_3$ | $s_{51}$ |
| Subcarrier 2 | $s_4$ | $s_{52}$ | $s_5$ | $s_{53}$ |
| Subcarrier 3 | $s_6$ | $s_{54}$ | $s_7$ | $s_{55}$ |
| Subcarrier 4 | $s_8$ | $s_{56}$ | $s_9$ | $s_{57}$ |
| Subcarrier 5 | $s_{10}$ | $s_{58}$ | $s_{11}$ | $s_{59}$ |
| Subcarrier 6 | $s_{12}$ | $s_{60}$ | $s_{13}$ | $s_{61}$ |
| Subcarrier 7 | $s_{14}$ | $s_{62}$ | $s_{15}$ | $s_{63}$ |
| Subcarrier 8 | $s_{16}$ | $s_{64}$ | $s_{17}$ | $s_{65}$ |
| Subcarrier 9 | $s_{18}$ | $s_{66}$ | $s_{19}$ | $s_{67}$ |
| Subcarrier 10 | $s_{20}$ | $s_{68}$ | $s_{21}$ | $s_{69}$ |
| Subcarrier 11 | $s_{22}$ | $s_{70}$ | $s_{23}$ | $s_{71}$ |
| Subcarrier 12 | $s_{24}$ | $s_{72}$ | $s_{25}$ | $s_{73}$ |
| Subcarrier 13 | $s_{26}$ | $s_{74}$ | $s_{27}$ | $s_{75}$ |

FIG. 2A

SM (Matrix B), 2 antennas (continued)

| Subcarrier 14 | $S_{28}$ | $S_{76}$ | $S_{29}$ | $S_{77}$ |
|---|---|---|---|---|
| Subcarrier 15 | $S_{30}$ | $S_{78}$ | $S_{31}$ | $S_{79}$ |
| Subcarrier 16 | $S_{32}$ | $S_{80}$ | $S_{33}$ | $S_{81}$ |
| Subcarrier 17 | $S_{34}$ | $S_{82}$ | $S_{35}$ | $S_{83}$ |
| Subcarrier 18 | $S_{36}$ | $S_{84}$ | $S_{37}$ | $S_{85}$ |
| Subcarrier 19 | $S_{38}$ | $S_{86}$ | $S_{39}$ | $S_{87}$ |
| Subcarrier 20 | $S_{40}$ | $S_{88}$ | $S_{41}$ | $S_{89}$ |
| Subcarrier 21 | $S_{42}$ | $S_{90}$ | $S_{43}$ | $S_{91}$ |
| Subcarrier 22 | $S_{44}$ | $S_{92}$ | $S_{45}$ | $S_{93}$ |
| Subcarrier 23 | $S_{46}$ | $S_{94}$ | $S_{47}$ | $S_{95}$ |

FIG. 2B

| | STTD (Matrix A), 2 antennas | | | | SM (Matrix B), 2 antennas | | | |
| --- | --- | --- | --- | --- | --- | --- | --- | --- |
| | Antenna 0 | | Antenna 1 | | Antenna 0 | | Antenna 1 | |
| | Even symbol | Odd symbol | Even symbol | Odd symbol | Even symbol | Odd symbol | Even symbol | Odd symbol |
| Subcarrier 0 | s0 | -s1* | s1 | s0* | s0 | s48 | s1 | s49 |
| Subcarrier 1 | s2 | -s3* | s3 | s2* | s2 | s50 | s3 | s51 |
| Subcarrier 2 | s4 | -s5* | s5 | s4* | s4 | s52 | s5 | s53 |
| ... | | | | | | | | |
| Subcarrier 22 | s44 | -s45* | s45 | s44* | s44 | s92 | s45 | s93 |
| Subcarrier 23 | s46 | -s47* | s47 | s46* | s46 | s94 | s47 | s95 |

FIG. 6

Transmit Diversity using SFC (Matrix A), 2 antennas

| | Antenna 0 | | Antenna 1 | |
|---|---|---|---|---|
| | Even symbol | Odd symbol | Even symbol | Odd symbol |
| Subcarrier 0 | s0 | s24 | s1 | s25 |
| Subcarrier 1 | -s1* | -s25* | s0* | s24* |
| Subcarrier 2 | s2 | s26 | s3 | s27 |
| | | | | |
| Subcarrier 22 | s22 | s46 | s23 | s47 |
| Subcarrier 23 | -s23* | -s47* | s22* | s46* |

SM (Matrix B), 2 antennas

| Antenna 0 | | Antenna 1 | |
|---|---|---|---|
| Even symbol | Odd symbol | Even symbol | Odd symbol |
| s0 | s48 | s1 | s49 |
| s2 | s50 | s3 | s51 |
| s4 | s52 | s5 | s53 |
| | | | |
| s44 | s92 | s45 | s93 |
| s46 | s94 | s47 | s95 |

FIG. 11

DATA SYMBOL MAPPING FOR MULTIPLE-INPUT MULTIPLE-OUTPUT HYBRID AUTOMATIC REPEAT REQUEST

CROSS-REFERENCE TO RELATED APPLICATIONS

This application claims the benefit of U.S. Provisional Application No. 61/046,934, filed on Apr. 22, 2008. The disclosure of the above application is incorporated herein by reference in its entirety.

FIELD

The present disclosure relates to wireless communication systems, and more particularly to mapping data symbols when transmitting data via multiple-input multiple-output (MIMO) antennas.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Wireless Worldwide Interoperability for Microwave Access (WiMAX) devices adhere to the I.E.E.E. 802.16 standard, which is incorporated herein by reference in its entirety. The WiMAX devices (hereinafter devices) include base stations (BSs) and mobile stations (MSs). A transmission from a BS to a MS is called downlink (DL), and a transmission from the MS to the BS is called uplink (UL). The BS and the MS may each include a single antenna or a plurality of antennas. The plurality of antennas is typically arranged in a multiple-input multiple-output (MIMO) configuration. Antennas arranged in the MIMO configuration (hereinafter MIMO antennas) provide better non-line-of-sight (NLOS) characteristics than single antennas.

Depending on the MIMO configuration used (i.e., depending on the number of transmit and receive antennas used), the devices may transmit data using different MIMO modes. For example, devices using two transmit antennas may transmit data mapped in a Matrix A mode and/or in a Matrix B mode. In the Matrix A mode, data symbols are mapped onto the transmit antennas using space time codes (STC). In the Matrix B mode, data symbols are mapped onto the transmit antennas using spatial multiplexing (SM).

In the Matrix A mode, two different data bit constellations are transmitted via two different antennas during the same symbol transmission. Conjugates of the same two constellations (e.g., the two constellations with sign changed) are transmitted again via the same antennas during another symbol transmission. In the Matrix B mode, a first data bit is transmitted via a first antenna, and a second data bit is transmitted via a second antenna during the same symbol transmission. The Matrix A mode offers greater range than the Matrix B mode. The Matrix B mode offers faster data rates than the Matrix A mode.

When transmitting data, the devices may select the Matrix A mode or the Matrix B mode depending on various factors. For example, the factors may include channel quality, number of receive antennas, quality of service requested, etc. Depending on changes in one or more of the factors, the devices may switch between the Matrix A mode and the Matrix B mode when transmitting data.

Occasionally, when a first device transmits data to a second device, the second device may not correctly receive the transmitted data. Accordingly, the first and second devices may use one or more techniques that enable the second device to detect and correct errors in the received data. The techniques comprise automatic repeat request (ARQ) and hybrid ARQ (HARQ).

When ARQ is used, the first device adds error detection (ED) bits (e.g., cyclic redundancy check (CRC) bits) to the transmitted data. When HARQ is used, the first device adds the ED bits and/or forward error correction (FEC) bits to the transmitted data. Typically, the ED and FEC bits are transmitted alternately on successive transmissions.

The second device transmits an acknowledgement (ACK) to the first device when the second device correctly receives the transmitted data. If the received data is erroneous, the second device corrects errors in the received data using the ED bits and/or the FEC bits and transmits the ACK to the first device. When the second device cannot correct the errors, the second device sends a retransmit request to the first device to retransmit the data. When the retransmit request is received, the first device retransmits the same data to the second device.

When the retransmitted data received by the second device has errors, the second device may attempt to correct the errors by combining the data received in the initial transmission and the data received in the retransmission. When HARQ is used, the second device may combine the data in two ways: chase combining and incremental redundancy. In chase combining, every retransmission contains the same information (data and parity bits). In incremental redundancy, every retransmission contains different information than a prior retransmission.

SUMMARY

A system comprises an encoding module, a symbol selection module, a subcarrier selection module, and a mapping module. The encoding module receives symbols for transmission over K subcarriers and T antennas, encodes the symbols using a space time code, and generates space time coded (STC) versions of the symbols, where K and T are integers greater than 1. The symbol selection module selects T adjacent ones of the symbols and selects STC versions of the T adjacent ones of the symbols. The subcarrier selection module selects one of the K subcarriers for transmitting the T adjacent ones of the symbols and the STC versions of the T adjacent ones of the symbols. The mapping module maps the T adjacent ones of the symbols onto the T antennas for transmission over the selected one of the K subcarriers, respectively, and maps the STC versions of the T adjacent ones of the symbols onto the T antennas for transmission over the selected one of the K subcarriers.

In other features, a transmitter comprises the system and further comprises the T antennas and T driver modules that drive the T antennas, respectively. The T driver modules transmit the T adjacent ones of the symbols over the selected one of the K subcarriers via the T antennas, respectively. The T driver modules transmit the STC versions of the T adjacent ones of the symbols over the selected one of the K subcarriers via the T antennas.

In other features, a system comprises the transmitter and further comprises a receiver that includes a preprocessing module, a combining module, and a decoding module. The preprocessing module receives the T adjacent ones of the symbols and the STC versions of the T adjacent ones of the symbols transmitted over the one of the K subcarriers. The preprocessing module decodes the STC versions of the T adjacent ones of the symbols and generates decoded symbols. The combining module combines the decoded symbols and corresponding ones of the T adjacent ones of the symbols. The decoding module decodes the T adjacent ones of the symbols based on a combination of the decoded symbols and the corresponding ones of the T adjacent ones of the symbols.

In still other features, a receiver comprises a preprocessing module, a combining module and a decoding module. The preprocessing module receives T adjacent symbols transmitted over a subcarrier via T antennas, respectively, where T is an integer greater than 1. The preprocessing module receives space time coded (STC) versions of the T adjacent symbols transmitted over the subcarrier via the T antennas. The preprocessing module receives decodes the STC versions of the T adjacent symbols and generates decoded symbols. The combining module combines the decoded symbols and corresponding ones of the T adjacent symbols. The decoding module decodes the T adjacent symbols based on a combination of the decoded symbols and the corresponding ones of the T adjacent symbols.

In still other features, a transmitter comprises a control module, a first mapping module, and a second mapping module. The control module selects first and second mapping modes to map symbols onto K subcarriers and T antennas during first and second transmissions of the symbols, respectively, where K and T are integers greater than 1. The first mapping module maps T adjacent ones of the symbols onto the T antennas for transmission over one of the K subcarriers, respectively, when the first mapping mode is selected. The second mapping module maps the T adjacent ones of the symbols onto the T antennas for transmission over the one of the K subcarriers, respectively. The second mapping module maps space time coded (STC) versions of the T adjacent ones of the symbols onto the T antennas for transmission over the one of the K subcarriers when the second mapping mode is selected.

In other features, the transmitter further comprises the T antennas and T driver modules that drive the T antennas, respectively. The T driver modules transmit the T adjacent ones of the symbols over the one of the K subcarriers via the T antennas, respectively, during the first and second transmissions. The T driver modules transmit the STC versions of the T adjacent ones of the symbols over the one of the K subcarriers via the T antennas during the second transmission.

In other features, a system comprises the transmitter and further comprises a receiver that includes a preprocessing module, a combining module, and a decoding module. The preprocessing module receives the T adjacent ones of the symbols transmitted over the one of the K subcarriers via the T antennas, respectively, during the first and second transmissions. The combining module combines the T adjacent ones of the symbols transmitted over the one of the K subcarriers via the T antennas during the first transmission with corresponding ones of the T adjacent ones of the symbols transmitted over the one of the K subcarriers via the T antennas during the second transmission. The decoding module decodes the T adjacent ones of the symbols based on a combination of the T adjacent ones of the symbols transmitted over the one of the K subcarriers via the T antennas during the first and second transmissions.

In other features, a system comprises the transmitter and further comprises a receiver that includes a preprocessing module, a combining module, and a decoding module. The preprocessing module receives the T adjacent ones of the symbols and the STC versions of the T adjacent ones of the symbols transmitted over the one of the K subcarriers during the second transmission. The preprocessing module decodes the STC versions of the T adjacent ones of the symbols and generates decoded symbols. The combining module combines the decoded symbols and corresponding ones of the T adjacent ones of the symbols. The decoding module decodes the T adjacent ones of the symbols based on a combination of the decoded symbols and the corresponding ones of the T adjacent ones of the symbols.

In still other features, a receiver comprises a preprocessing module, a combining module, and a decoding module. The preprocessing module receives T adjacent symbols transmitted over a subcarrier via T antennas during a first transmission, respectively, where T is an integer greater than 1. The preprocessing module receives the T adjacent symbols and space time coded (STC) versions of the T adjacent symbols transmitted over the subcarrier via the T antennas during a second transmission. The combining module combines the T adjacent symbols transmitted over the subcarrier via the T antennas during the first transmission with corresponding ones of the T adjacent symbols transmitted over the subcarrier via the T antennas during the second transmission. The decoding module decodes the T adjacent symbols based on a combination of the T adjacent symbols transmitted over the subcarrier via the T antennas during the first and second transmissions.

In still other features, a system comprises an encoding module, a symbol selection module, a subcarrier selection module, and a mapping module. The encoding module receives symbols for transmission over K subcarriers and T antennas, encodes the symbols using a space frequency code, and generates space frequency coded (SFC) versions of the symbols, where K and T are integers greater than 1. The symbol selection module selects T adjacent ones of the symbols and selects SFC versions of the T adjacent ones of the symbols. The subcarrier selection module selects a first one of the K subcarriers for transmitting the T adjacent ones of the symbols. The subcarrier selection module selects a second one of the K subcarriers that is adjacent to the first one of the K subcarriers for transmitting the SFC versions of the T adjacent ones of the symbols. The mapping module maps the T adjacent ones of the symbols onto the T antennas for transmission over the first one of the K subcarriers, respectively. The mapping module maps the SFC versions of the T adjacent ones of the symbols onto the T antennas for transmission over the second one of the K subcarriers.

In other features, a transmitter comprises the system and further comprises the T antennas and T driver modules that drive the T antennas, respectively. The T driver modules transmit the T adjacent ones of the symbols over the first one of the K subcarriers via the T antennas, respectively. The T driver modules transmit the SFC versions of the T adjacent ones of the symbols over the second one of the K subcarriers via the T antennas.

In other features, a system comprises the transmitter and further comprises a receiver that includes a preprocessing module, v, and a decoding module. The preprocessing module receives the T adjacent ones of the symbols and the SFC versions of the T adjacent ones of the symbols, decodes the SFC versions of the T adjacent ones of the symbols, and generates decoded symbols. The combining module combines the decoded symbols and corresponding ones of the T adjacent ones of the symbols. The decoding module decodes the T adjacent ones of the symbols based on a combination of the decoded symbols and the corresponding ones of the T adjacent ones of the symbols.

In still other features, a receiver comprises a preprocessing module, a combining module, and a decoding module. The preprocessing module receives T adjacent symbols transmitted over a first subcarrier via T antennas, respectively, where T is an integer greater than 1. The preprocessing module receives space frequency coded (SFC) versions of the T adjacent symbols transmitted over a second subcarrier that is adjacent to the first subcarrier via the T antennas. The preprocessing module decodes the SFC versions of the T adjacent symbols and that generates decoded symbols. The combining module combines the decoded symbols and corresponding ones of the T adjacent symbols. The decoding module decodes the T adjacent symbols based on a combination of the decoded symbols and the corresponding ones of the T adjacent symbols.

In still other features, a transmitter comprises a control module, a first mapping module, and a second mapping module. The control module selects first and second mapping modes to map symbols onto K subcarriers and T antennas during first and second transmissions of the symbols, respectively, where K and T are integers greater than 1. The first mapping module maps T adjacent ones of the symbols onto the T antennas for transmission over a first one of the K subcarriers, respectively, when the first mapping mode is selected. The second mapping module maps the T adjacent ones of the symbols onto the T antennas for transmission over a second one of the K subcarriers, respectively. The second mapping module maps space frequency coded (SFC) versions of the T adjacent ones of the symbols onto the T antennas for transmission over a third one of the K subcarriers that is adjacent to the second one of the K subcarriers when the second mapping mode is selected.

In other features, the transmitter further comprises the T antennas and T driver modules that drive the T antennas, respectively. The T driver modules transmit the T adjacent ones of the symbols over the first and second ones of the K subcarriers via the T antennas during the first and second transmissions, respectively. The T driver modules transmit the SFC versions of the T adjacent ones of the symbols over the third one of the K subcarriers via the T antennas during the second transmission.

In other features, a system comprises the transmitter and further comprises a receiver that includes a preprocessing module, a combining module, and a decoding module. The preprocessing module receives the T adjacent ones of the symbols transmitted over the first and second ones of the K subcarriers during the first and second transmissions, respectively. The combining module combines the T adjacent ones of the symbols transmitted over the first one of the K subcarriers during the first transmission with corresponding ones of the T adjacent ones of the symbols transmitted over the second one of the K subcarriers during the second transmission. The decoding module decodes the T adjacent ones of the symbols based on a combination of the T adjacent ones of the symbols transmitted over the first and second ones of the K subcarriers during the first and second transmissions, respectively.

In other features, a system comprises the transmitter and further comprises a receiver that includes a preprocessing module, a combining module, and a decoding module. The preprocessing module receives the T adjacent ones of the symbols and the SFC versions of the T adjacent ones of the symbols transmitted during the second transmission. The preprocessing module decodes the SFC versions of the T adjacent ones of the symbols, and generates decoded symbols. The combining module combines the decoded symbols and corresponding ones of the T adjacent ones of the symbols. The decoding module decodes the T adjacent ones of the symbols based on a combination of the decoded symbols and the corresponding ones of the T adjacent ones of the symbols.

In still other features, a receiver comprises a preprocessing module, a combining module, and a decoding module. The preprocessing module receives T adjacent symbols transmitted over a first subcarrier via T antennas during a first transmission, respectively, where T is an integer greater than 1. The preprocessing module receives the T adjacent symbols transmitted over a second subcarrier via the T antennas during a second transmission. The preprocessing module receives space frequency coded (SFC) versions of the T adjacent symbols transmitted over a third subcarrier that is adjacent to the second subcarrier via the T antennas during the second transmission. The combining module combines the T adjacent symbols transmitted over the first subcarrier during the first transmission with corresponding ones of the T adjacent symbols transmitted over the second subcarrier during the second transmission. The decoding module decodes the T adjacent symbols based on a combination of the T adjacent symbols transmitted over the first and second subcarriers during the first and second transmissions.

In still other features, a method comprises receiving symbols for transmission over K subcarriers and T antennas, where K and T are integers greater than 1, and encoding the symbols using a space time code and generating space time coded (STC) versions of the symbols. The method further comprise selecting T adjacent ones of the symbols and STC versions of the T adjacent ones of the symbols and selecting one of the K subcarriers for transmitting the T adjacent ones of the symbols and the STC versions of the T adjacent ones of the symbols. The method further comprises mapping the T adjacent ones of the symbols onto the T antennas for transmission over the selected one of the K subcarriers, respectively. The method further comprises mapping the STC versions of the T adjacent ones of the symbols onto the T antennas for transmission over the selected one of the K subcarriers.

In other features, the method further comprises driving the T antennas using T driver modules, respectively. The method further comprises transmitting the T adjacent ones of the symbols over the selected one of the K subcarriers via the T antennas, respectively. The method further comprises transmitting the STC versions of the T adjacent ones of the symbols over the selected one of the K subcarriers via the T antennas.

In other features, the method further comprises receiving the T adjacent ones of the symbols and the STC versions of the T adjacent ones of the symbols transmitted over the one of the K subcarriers and decoding the STC versions of the T adjacent ones of the symbols and generating decoded symbols. The method further comprises combining the decoded symbols and corresponding ones of the T adjacent ones of the symbols. The method further comprises decoding the T adjacent ones of the symbols based on a combination of the decoded symbols and the corresponding ones of the T adjacent ones of the symbols.

In still other features, a method comprises receiving T adjacent symbols transmitted over a subcarrier via T antennas, respectively, where T is an integer greater than 1. The method further comprises receiving space time coded (STC) versions of the T adjacent symbols transmitted over the subcarrier via the T antennas and decoding the STC versions of the T adjacent symbols and generating decoded symbols. The method further comprises combining the decoded symbols and corresponding ones of the T adjacent symbols and decoding the T adjacent symbols based on a combination of the decoded symbols and the corresponding ones of the T adjacent symbols.

In still other features, a method comprises selecting first and second mapping modes to map symbols onto K subcarriers and T antennas during first and second transmissions of the symbols, respectively, where K and T are integers greater than 1. The method further comprises mapping T adjacent ones of the symbols onto the T antennas for transmission over one of the K subcarriers, respectively, when the first mapping mode is selected. The method further comprises mapping the T adjacent ones of the symbols onto the T antennas for transmission over the one of the K subcarriers, respectively, when the second mapping mode is selected. The method further comprises mapping space time coded (STC) versions of the T adjacent ones of the symbols onto the T antennas for transmission over the one of the K subcarriers when the second mapping mode is selected.

In other features, the method further comprises driving the T antennas using T driver modules, respectively. The method further comprises transmitting the T adjacent ones of the symbols over the one of the K subcarriers via the T antennas, respectively, during the first and second transmissions. The method further comprises transmitting the STC versions of the T adjacent ones of the symbols over the one of the K subcarriers via the T antennas during the second transmission.

In other features, the method further comprises receiving the T adjacent ones of the symbols transmitted over the one of the K subcarriers via the T antennas, respectively, during the first and second transmissions. The method further comprises combining the T adjacent ones of the symbols transmitted over the one of the K subcarriers via the T antennas during the first transmission with corresponding ones of the T adjacent ones of the symbols transmitted over the one of the K subcarriers via the T antennas during the second transmission. The method further comprises decoding the T adjacent ones of the symbols based on a combination of the T adjacent ones of the symbols transmitted over the one of the K subcarriers via the T antennas during the first and second transmissions.

In other features, the method further comprises receiving the T adjacent ones of the symbols and the STC versions of the T adjacent ones of the symbols transmitted over the one of the K subcarriers during the second transmission. The method further comprises decoding the STC versions of the T adjacent ones of the symbols and generating decoded symbols and combining the decoded symbols and corresponding ones of the T adjacent ones of the symbols. The method further comprises decoding the T adjacent ones of the symbols based on a combination of the decoded symbols and the corresponding ones of the T adjacent ones of the symbols.

In still other features, a method comprises receiving T adjacent symbols transmitted over a subcarrier via T antennas during a first transmission, respectively, where T is an integer greater than 1. The method further comprises receiving the T adjacent symbols and space time coded (STC) versions of the T adjacent symbols transmitted over the subcarrier via the T antennas during a second transmission. The method further comprises combining the T adjacent symbols transmitted over the subcarrier via the T antennas during the first transmission with corresponding ones of the T adjacent symbols transmitted over the subcarrier via the T antennas during the second transmission. The method further comprises decoding the T adjacent symbols based on a combination of the T adjacent symbols transmitted over the subcarrier via the T antennas during the first and second transmissions.

In still other features, a method comprises receiving symbols for transmission over K subcarriers and T antennas, where K and T are integers greater than 1, and encoding the symbols using a space frequency code and generating space frequency coded (SFC) versions of the symbols. The method further comprises selecting T adjacent ones of the symbols and SFC versions of the T adjacent ones of the symbols and selecting a first one of the K subcarriers for transmitting the T adjacent ones of the symbols. The method further comprises selecting a second one of the K subcarriers that is adjacent to the first one of the K subcarriers for transmitting the SFC versions of the T adjacent ones of the symbols. The method further comprises mapping the T adjacent ones of the symbols onto the T antennas for transmission over the first one of the K subcarriers, respectively. The method further comprises mapping the SFC versions of the T adjacent ones of the symbols onto the T antennas for transmission over the second one of the K subcarriers.

In other features, the method further comprises driving the T antennas using T driver modules, respectively. The method further comprises transmitting the T adjacent ones of the symbols over the first one of the K subcarriers via the T antennas, respectively. The method further comprises transmitting the SFC versions of the T adjacent ones of the symbols over the second one of the K subcarriers via the T antennas.

In other features, the method further comprises receiving the T adjacent ones of the symbols and the SFC versions of the T adjacent ones of the symbols and decoding the SFC versions of the T adjacent ones of the symbols and generating decoded symbols. The method further comprises combining the decoded symbols and corresponding ones of the T adjacent ones of the symbols and decoding the T adjacent ones of the symbols based on a combination of the decoded symbols and the corresponding ones of the T adjacent ones of the symbols.

In still other features, a method comprises receiving T adjacent symbols transmitted over a first subcarrier via T antennas, respectively, where T is an integer greater than 1, and receiving space frequency coded (SFC) versions of the T adjacent symbols transmitted over a second subcarrier that is adjacent to the first subcarrier via the T antennas. The method further comprises decoding the SFC versions of the T adjacent symbols and generating decoded symbols and combining the decoded symbols and corresponding ones of the T adjacent symbols. The method further comprises decoding the T adjacent symbols based on a combination of the decoded symbols and the corresponding ones of the T adjacent symbols.

In still other features, a method comprises selecting first and second mapping modes to map symbols onto K subcarriers and T antennas during first and second transmissions of the symbols, respectively, where K and T are integers greater than 1. The method further comprises mapping T adjacent ones of the symbols onto the T antennas for transmission over a first one of the K subcarriers, respectively, when the first mapping mode is selected. The method further comprises mapping the T adjacent ones of the symbols onto the T antennas for transmission over a second one of the K subcarriers, respectively, when the second mapping mode is selected. The method further comprises mapping space frequency coded (SFC) versions of the T adjacent ones of the symbols onto the T antennas for transmission over a third one of the K subcarriers that is adjacent to the second one of the K subcarriers when the second mapping mode is selected.

In other features, the method further comprises driving the T antennas using T driver modules, respectively. The method further comprises transmitting the T adjacent ones of the symbols over the first and second ones of the K subcarriers via the T antennas during the first and second transmissions, respectively. The method further comprises transmitting the SFC versions of the T adjacent ones of the symbols over the third one of the K subcarriers via the antennas during the second transmission.

In other features, the method further comprises receiving the T adjacent ones of the symbols transmitted over the first and second ones of the K subcarriers during the first and second transmissions, respectively. The method further comprises combining the T adjacent ones of the symbols transmitted over the first one of the K subcarriers during the first transmission with corresponding ones of the T adjacent ones of the symbols transmitted over the second one of the K subcarriers during the second transmission. The method further comprises decoding the T adjacent ones of the symbols based on a combination of the T adjacent ones of the symbols transmitted over the first and second ones of the K subcarriers during the first and second transmissions, respectively.

In other features, the method further comprises receiving the T adjacent ones of the symbols and the SFC versions of the T adjacent ones of the symbols transmitted during the second transmission. The method further comprises decoding the SFC versions of the T adjacent ones of the symbols and generating decoded symbols and combining the decoded symbols and corresponding ones of the T adjacent ones of the symbols. The method further comprises decoding the T adjacent ones of the symbols based on a combination of the decoded symbols and the corresponding ones of the T adjacent ones of the symbols.

In still other features, a method comprises receiving T adjacent symbols transmitted over a first subcarrier via T antennas during a first transmission, respectively, where T is an integer greater than 1. The method further comprises receiving the T adjacent symbols transmitted over a second subcarrier via the T antennas during a second transmission. The method further comprises receiving space frequency coded (SFC) versions of the T adjacent symbols transmitted over a third subcarrier that is adjacent to the second subcarrier via the T antennas during the second transmission. The method further comprises combining the T adjacent symbols transmitted over the first subcarrier during the first transmission with corresponding ones of the T adjacent symbols transmitted over the second subcarrier during the second transmission. The method further comprises decoding the T adjacent symbols based on a combination of the T adjacent symbols transmitted over the first and second subcarriers during the first and second transmissions.

In still other features, the systems described above are implemented by a computer program executed by one or more processors. The computer program can reside on a computer readable medium such as memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIGS. 1A and 1B show mapping of symbols in a Matrix A mode;

FIGS. 2A and 2B show mapping of symbols in a Matrix B mode;

FIG. 6 shows mapping of symbols in a new Matrix A mode using space time codes (STC) and the Matrix B mode;

FIG. 11 shows mapping of symbols in a new Matrix A mode using space frequency codes (SFC) and the Matrix B mode;

DESCRIPTION

Figure 3B:
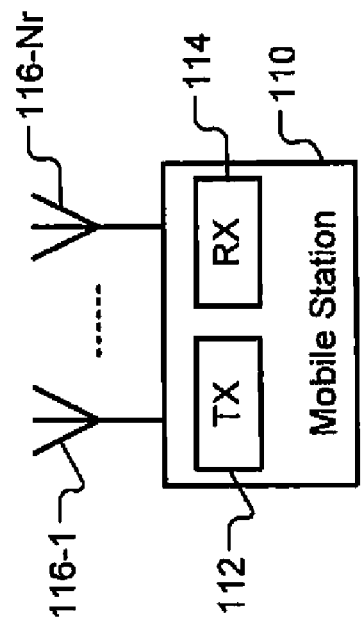
FIGS. 3A and 3B are functional block diagrams of a base station and a mobile station, respectively.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware components that provide the described functionality.

Wireless Worldwide Interoperability for Microwave Access (WiMAX) devices using two multiple-input multiple-output (MIMO) antennas may transmit data in Matrix A mode and may retransmit the data in Matrix B mode (or vice versa) in response to a hybrid automatic repeat request (HARQ). Chase combining the data transmitted in Matrix A mode and the data retransmitted in Matrix B mode at receiving devices can, however, involve complex operations. Presently used low-complexity receivers cannot chase combine the data transmitted in Matrix A mode and the data retransmitted in Matrix B mode without sacrificing performance. Conversely, to maintain performance while chase combining the data transmitted in Matrix A mode and the data retransmitted in Matrix B mode, complexity of receivers may have to be increased. Increasing complexity can increase the cost of the receivers.

The present disclosure relates to a new data mapping in Matrix A mode that is different than the data mapping presently used when transmitting data in Matrix A mode. The new data mapping in Matrix A mode is hereinafter referred to as the new data mapping or the new Matrix A mode. The new data mapping allows the low-complexity receivers to chase combine the data transmitted in the new Matrix A mode and the data retransmitted in Matrix B mode without sacrificing performance.

Throughout the disclosure, devices that have two transmit antennas and that transmit data in Matrix A mode and/or Matrix B mode are used as examples only. The teachings of the disclosure, however, can be extended to devices that transmit data via more than two antennas using other MIMO modes in addition to Matrix A and Matrix B modes.

Generally, data mapping includes mapping data symbols over different combinations of subcarrier frequencies, antennas, and time. Distributed mapping may be used to utilize various forms of diversity (frequency, space, and time) offered by a communication channel. Alternatively, contiguous mapping with adaptive modulation coding may be used to utilize the slow changing nature of the communication channel.

Referring now to FIGS. 1A-2B, examples of data mappings in Matrix A mode and Matrix B mode are shown when two transmit antennas are used. The examples include downlink (DL) communication. In FIGS. 1A and 1B, data mapping in Matrix A mode is shown, where STTD denotes space time coded (STC) transmit diversity. In FIGS. 2A and 2B, data mapping in Matrix B mode is shown, where SM denotes spatial multiplexing.

In Matrix A mode, symbols are mapped onto subcarrier frequencies and antennas in the following order: frequency first, antenna first, and symbol first. In Matrix B mode, symbols are mapped onto subcarrier frequencies and antennas in the following order: antenna first, frequency first, and symbol first. Data mappings in Matrix A mode and Matrix B mode are now described in detail.

In FIGS. 1A and 1B, in Matrix A mode, symbols S0 through S47 are mapped on subcarriers 0 through 23 for transmission via antenna 0 and antenna 1 using STTD as follows. First, Symbols S0 through 823 are mapped on subcarriers 0 through 23 for transmission via antenna 0, respectively. After all the subcarriers are exhausted, symbols S24 through S47 are mapped on subcarriers 0 through 23 for transmission via antenna 1, respectively.

More specifically, symbol S0 is mapped on subcarrier 0 for transmission via antenna 0. Thereafter, antenna 1 is not selected to map symbol S1. Instead, subcarrier 1 is selected to map symbol S1. Thus, symbol S1 is mapped on subcarrier 1 for transmission via antenna 0, and so on until symbol S23 is mapped on subcarrier 23 for transmission via antenna 0. After all the subcarriers are exhausted, symbol S24 is mapped on subcarrier 0 for transmission via antenna 1. Thereafter, symbol S25 is mapped on subcarrier 1 for transmission via antenna 1, and so on until symbol S47 is mapped on subcarrier 23 for transmission via antenna 1.

Additionally, a complex conjugate S0* of symbol S0 is mapped on subcarrier 0 for transmission via antenna 1. Thereafter, a complex conjugate S1* of symbol S1 is mapped on subcarrier 1 for transmission via antenna 1, and so on until a complex conjugate S23* of symbol S23 is mapped on subcarrier 23 for transmission via antenna 1. After all the subcarriers are exhausted, a complex conjugate of symbol S24 with sign changed (i.e., (−S24*)) is mapped on subcarrier 0 for transmission via antenna 0. Thereafter, a complex conjugate of symbol S25 with sign changed (i.e., (−S25*)) is mapped on subcarrier 1 for transmission via antenna 0, and so on until a complex conjugate of symbol S47 with sign changed (i.e., (−S47*)) is mapped on subcarrier 23 for transmission via antenna 0.

Symbols S0*, S1*, . . . , and S23*, and symbols (−S24*), (−S25*), . . . , and (−S47*) are coded versions of symbols S0, S1, . . . , and S23, and symbols S24, S25, . . . , and S47, respectively. The coded versions are generated using space time codes (STC). For example only, the STC may include Alamouti code. The STC may also include space time block codes.

During transmission, when symbol S0 is transmitted on subcarrier 0 via antenna 0, symbol S24 is transmitted on subcarrier 0 via antenna 1. When symbol (−S24*) is transmitted on subcarrier 0 via antenna 0, symbol S0* is transmitted on subcarrier 0 via antenna 1. When symbol S1 is transmitted on subcarrier 1 via antenna 0, symbol S25 is transmitted on subcarrier 1 via antenna 1. When symbol (−S25*) is transmitted on subcarrier 1 via antenna 0, symbol S1* is transmitted on subcarrier 1 via antenna 1, and so on.

In FIGS. 2A and 2B, in Matrix B mode, symbols S0 through S95 are mapped on subcarriers 0 through 23 for transmission via antenna 0 and antenna 1 using spatial multiplexing (SM) as follows. Symbol S0 is mapped on subcarrier 0 for transmission via antenna 0. Subsequently, subcarrier 1 is not selected for mapping symbol S1. Instead, antenna 1 is selected for mapping symbol S1. Thus, symbol S1 is mapped on subcarrier 0 for transmission via antenna 1. After both the antennas are exhausted, subcarrier 1 is selected. Symbols S2 and S3 are mapped on subcarrier 1 for transmission via antenna 0 and antenna 1, respectively, and so on until symbols S46 and S47 are mapped on subcarrier 23 for transmission via antenna 0 and antenna 1, respectively.

Thereafter, symbols S48 and S49 are mapped on subcarrier 0 for transmission via antenna 0 and antenna 1, respectively. Symbols S50 and S51 are mapped on subcarrier 1 for transmission via antenna 0 and antenna 1, respectively, and so on until symbols S94 and S95 are mapped on subcarrier 23 for transmission via antenna 0 and antenna 1, respectively.

During transmission, symbols S0 and S1 are transmitted on subcarrier 0 via antenna 0 and antenna 1, respectively. Symbols S2 and S3 are transmitted on subcarrier 1 via antenna 0 and antenna 1, respectively, and so on until symbols S46 and S47 are transmitted on subcarrier 23 via antenna 0 and antenna 1, respectively. Thereafter, symbols S48 and S49 are transmitted on subcarrier 0 via antenna 0 and antenna 1, respectively. Symbols S50 and S51 are transmitted on subcarrier 1 via antenna 0 and antenna 1, respectively, and so on until symbols S94 and S95 are transmitted on subcarrier 23 via antenna 0 and antenna 1, respectively.

Figure 3A:
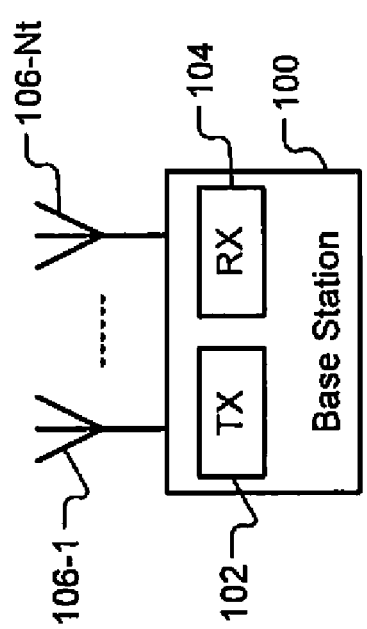

Referring now to FIGS. 3A and 3B, a base station (BS) 100 and a mobile station (MS) 110 is shown. BS 100 and MS 110 are WiMAX devices. BS 100 and MS 110 may use orthogonal frequency division multiple access (OFDMA). In OFDMA, transmit signals are modulated using orthogonal frequency division multiplexing (OFDM).

BS 100 comprises a transmitter TX 102, a receiver RX 104, and antennas 106-1, . . . , and 106-Nt (collectively antennas 106), where Nt denotes a number of transmit antennas. For example only, let Nt=2. That is, for example only, let BS 100 comprise two antennas 106. Transmitter TX 102 may transmit data by switching between Matrix A and Matrix B modes depending on channel conditions and whether greater range or higher data rate is desired.

MS 110 comprises a transmitter TX 112, a receiver RX 114, and antennas 116-1, . . . , and 116-Nr (collectively antennas 116), where Nr denotes number of receive antennas. For example only, let Nr=2. That is, for example only, let MS 110 comprise two antennas 116.

Figure 4A:
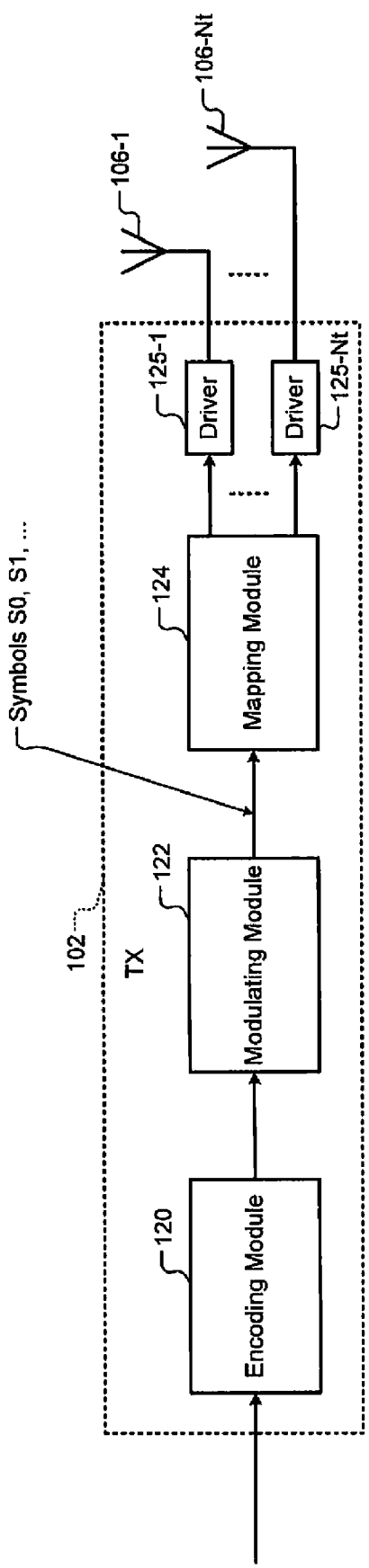
FIGS. 4A and 4B depict a functional block diagram of a transmitter of the base station of FIG. 3A.
Figure 4B:
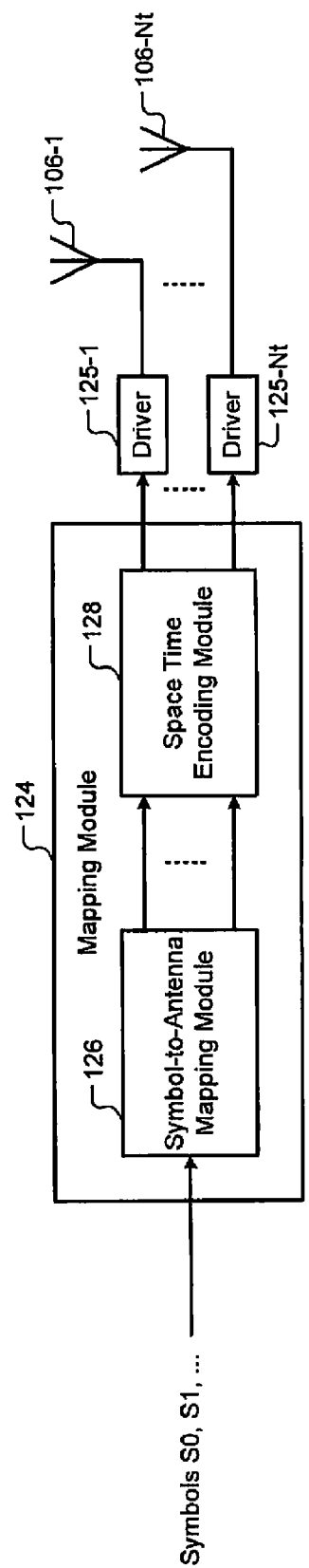

Referring now to FIGS. 4A and 4B, the transmitter TX 102 is shown. In FIG. 4A, the transmitter TX 102 comprises an encoding module 120, a modulating module 122, a mapping module 124, and drivers 125-1, 125-2, . . . , and 125-Nt (collectively drivers 125), and antennas 106. In FIG. 4B, the mapping module 124 comprises a symbol-to-antenna mapping module 126 and a space time encoding module 128.

The encoding module 120 encodes data generated by BS 100 for transmission by transmitter TX 102 and generates encoded data. The encoding module 120 may use forward error correction (FEC) codes to encode the data. Additionally, the encoding module 120 comprises an interleaver (not shown) that interleaves the data transmitted by transmitter TX 102.

The modulating module 122 modulates the encoded data received from the encoding module 120. The modulating module 122 performs bit-to-symbol mapping. For example only, the modulating module 122 may generate modulated symbols using quadrature amplitude modulation (QAM). The modulating module 122 generates symbols S0, S1, . . . , and S95.

The mapping module 124 maps symbols S0, S1, . . . , and S95 onto subcarriers 0 though 23 and antennas 106 using Matrix A and/or Matrix B modes. The mapping module 124 switches between Matrix A and Matrix B modes depending on channel conditions and whether greater range or higher data rate is desired. The drivers 125 drive the antennas 106. The drivers 125 transmit the symbols mapped by the mapping module 124 via the antennas 106.

The symbol-to-antenna mapping module 126 maps symbols S0 through S95 onto antennas 106 according to Matrix A mode or Matrix B mode. When Matrix A mode is used, the space time encoding module 128 encodes the symbols using space time codes (STC). When Matrix B mode is used, the space time encoding module 128 implements a spatial multiplexer or a switch that routes the symbols to appropriate antennas 106 according to the mapping in Matrix B mode. The antennas 106 transmit the symbols via antennas 106 on subcarriers 0 through 23 according to the mapping (i.e., Matrix A mode or Matrix B mode) selected.

Figure 5A:
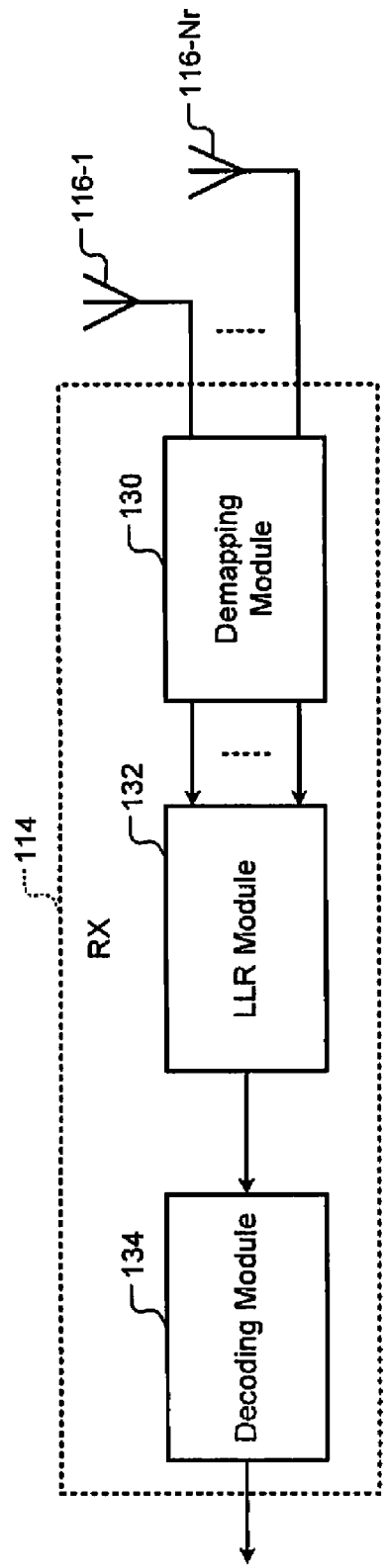
FIGS. 5A and 5B depict a functional block diagram of a receiver of the mobile station of FIG. 3B.
Figure 5B:
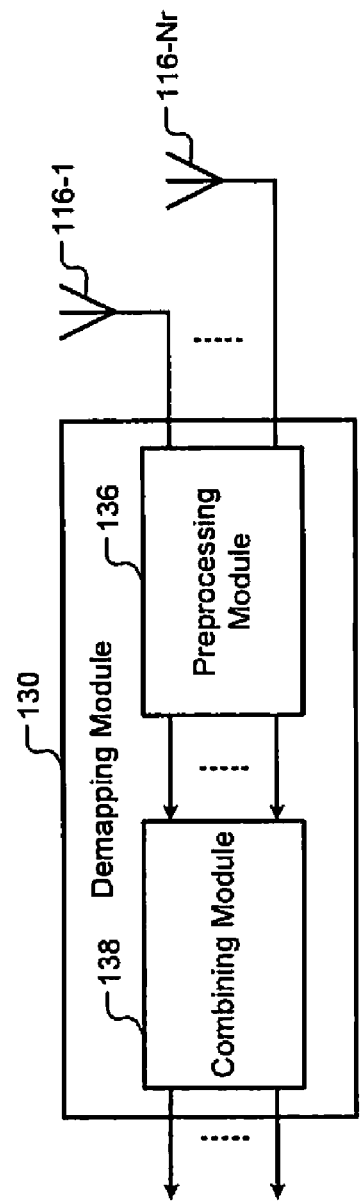

Referring now to FIGS. 5A and 5B, the receiver RX 114 is shown. In FIG. 5A, the receiver RX 114 comprises a demapping module 130, a log-likelihood ratio (LLR) module 132, and a decoding module 134. In FIG. 5B, the demapping module 130 comprises a preprocessing module 136 and a combining module 138.

OFDM signals are orthogonal with respect to frequency and time. The OFDM signals, however, are not orthogonal with respect to antennas. Accordingly, inter-stream interference may occur between streams of data received by receiver RX 114 via antennas 116. Although not shown, the receiver RX 114 may additionally comprise a MIMO equalizing module that reduces the inter-stream interference from an output of the demapping module 130.

The demapping module 130 receives data via antennas 116. The data may be mapped according to Matrix A mode or Matrix B mode. The demapping module 130 demaps the data. For example, when the data is mapped according to Matrix A mode, the preprocessing module 136 decodes the data. Additionally, the preprocessing module 136 changes the sign of symbols (−S24*), (−S25*), etc. When the data is received in response to HARQ, the combining module 138 combines the data received with previously received data.

The LLR module 132 generates LLRs based on the demapped data generated by the demapping module 130 or based on an equalized demapped data generated by the MIMO equalizing module. The decoding module 134 decodes the demapped data. Additionally, the decoding module 134 comprises a deinterleaver (not shown) that deinterleaves the demapped data. The decoding module 134 generates decoded data for use by MS 110.

Typically, the receiver RX 114 includes a low-complexity receiver and uses HARQ and chase combining for combining data at symbol level. When transmitter TX 102 transmits in Matrix A mode, receiver RX 114 may request retransmission using HARQ if the received data has irrecoverable errors. In response, transmitter TX 102 may retransmit the data in Matrix B mode, or vice versa. Receiver RX 114 may have to simultaneously process multiple subcarriers to chase combine information received in Matrix B mode and information received in Matrix A mode, or vice versa.

Being a low-complexity receiver, receiver RX 114 may be unable to sustain performance while chase combining information received in Matrix A mode followed by Matrix B mode, or vice versa. In other words, the performance of receiver RX 114 may decrease when transmitter TX 102 switches between Matrix A and Matrix B modes when transmitting adjacent data slots to receiver RX 114.

The new data mapping in Matrix A mode according to the present disclosure facilitates chase combining at symbol level without increasing complexity and decreasing performance of receiver RX 114. Specifically, the new data mapping simplifies the preprocessing performed by the preprocessing module 136. Additionally, the new data mapping simplifies combining data at symbol level by the combining module 138 when transmitter TX 102 uses the new data mapping and switches between the new Matrix A mode and the Matrix B mode when transmitting adjacent data slots to receiver RX 114.

Referring now to FIG. 6, an example of the new data mapping in Matrix A mode is shown along with the data mapping in Matrix B mode. For example only, the data mappings use two antennas and subcarriers 0 though 23 to transmit symbols S0 through S95. The teachings of the present disclosure can be extended to any number of antennas and subcarriers.

Only the new data mapping in Matrix A mode is described below. Since the data mapping in Matrix B mode is unchanged, the description of the data mapping in Matrix B mode provided with reference to FIGS. 2A and 2B remains unchanged and is not repeated.

In the new Matrix A mode, symbols are mapped onto subcarrier frequencies and antennas in the following order: antenna first, frequency first, and symbol first. For example, symbols S0 through S47 are mapped on subcarriers 0 through 23 for transmission via antenna 0 and antenna 1 as follows. Symbol S0 is mapped on subcarrier 0 for transmission via antenna 0. Subsequently, subcarrier 1 is not selected for mapping symbol S1. Instead, antenna 1 is selected for mapping symbol S1. Thus, symbol S1 is mapped on subcarrier 0 for transmission via antenna 1. After both the antennas are exhausted, subcarrier 1 is selected. Symbols S2 and S3 are mapped on subcarrier 1 for transmission via antenna 0 and antenna 1, respectively, and so on until symbols S46 and S47 are mapped on subcarrier 23 for transmission via antenna 0 and antenna 1, respectively.

Additionally, a complex conjugate S0* of symbol S0 is mapped on subcarrier 0 for transmission via antenna 1. A complex conjugate of symbol S1 with sign changed (i.e., (−S1*)) is mapped on subcarrier 0 for transmission via antenna 0. A complex conjugate S2* of symbol S2 and a complex conjugate of symbol S3 with sign changed (i.e., (−S3*)) are mapped on subcarrier 1 for transmission via antenna 1 and antenna 0, respectively. The mapping is continued until a complex conjugate S46* of symbol S46 and a complex conjugate of symbol S47 with sign changed (i.e., (−S47*)) are mapped on subcarrier 23 for transmission via antenna 1 and antenna 0, respectively.

Symbols S0*, S2*, . . . , and S46*, and symbols (−S1*), (−S3*), and (−S47*) are coded versions of symbols S0, S2, . . . , and S46, and symbols S1, S3, . . . , and S47, respectively. The coded versions are generated using space time codes (STC). For example only, the STC may include Alamouti code. The STC may also include space time block codes.

During transmission, symbols S0 and S1 are transmitted on subcarrier 0 via antenna 0 and antenna 1, respectively. Symbols S2 and S3 are transmitted on subcarrier 1 via antenna 0 and antenna 1, respectively, and so on until symbols S46 and S47 are transmitted on subcarrier 23 via antenna 0 and antenna 1, respectively. Thereafter, symbols (−S1*) and S0* are transmitted on subcarrier 0 via antenna 0 and antenna 1, respectively. Symbols (−S3*) and S2* are transmitted on subcarrier 1 via antenna 0 and antenna 1, respectively, and so on until symbols (−S47*) and S46* are transmitted on subcarrier 23 via antenna 0 and antenna 1, respectively. Thus, symbols S0 and S1 received on subcarrier 0 in a retransmission in the new Matrix A mode can be chase combined with symbols S0 and S1 received on subcarrier 0 in a prior transmission in the Matrix B mode, or vice versa.

Stated generally, the receiver receives symbols in sets of $(S_{2n}, S_{2n+1})$ in both the new Matrix A mode and the Matrix B mode instead of receiving symbols in sets of $(S_{2n}, S_{n+24})$ in the Matrix A mode and in sets of $(S_{2n}, S_{2n+1})$ in the Matrix B mode. Receiving symbols in sets of $(S_{2n}, S_{2n+1})$ in both the new Matrix A mode and the Matrix B mode enables a low-complexity receiver to chase combine symbols received in a retransmission in the new Matrix A mode with the symbols received in the Matrix B mode without degrading performance of the receiver.

Additionally, the new data mapping may be used to chase combine information received in the same data slot without requiring a retransmission of the data slot. For example, information in symbols S0 and S1 received on subcarrier 0 in a transmission of a data slot mapped in the new Matrix A mode can be chase combined with information derived from symbols S0* and (−S1*) received on subcarrier 0 in the same data slot, respectively.

Figure 7A:
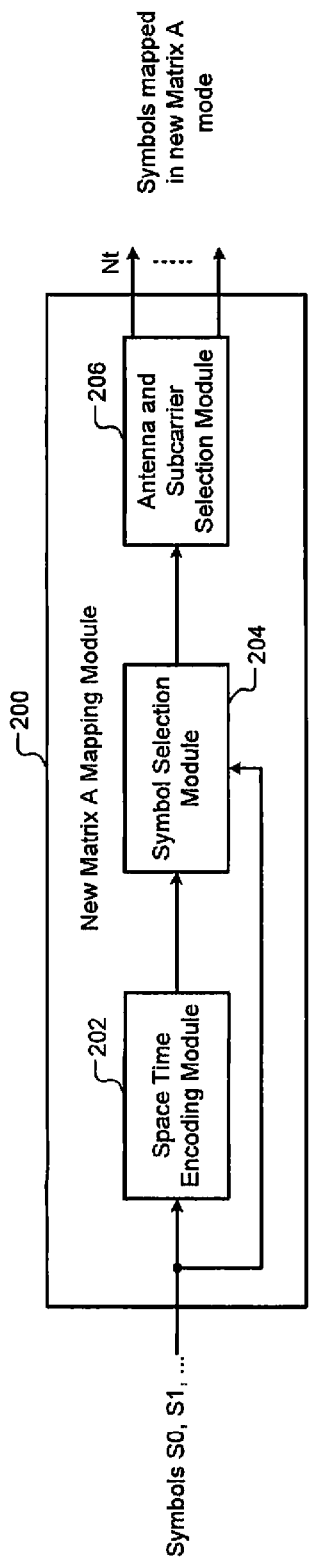
FIG. 7A is a functional block diagram of a mapping module that maps symbols according to the new Matrix A mode of FIG. 6.

Referring now to FIG. 7A, a new matrix A mapping module 200 (hereinafter mapping module 200) that generates the new data mapping in Matrix A mode according to the present disclosure is shown. The mapping module 200 comprises a space time encoding module 202, a symbol selection module 204, and an antenna and subcarrier selection module 206.

The space time encoding module 202 encodes symbols S0 through S47, for example, using space time codes (STC) and generates coded versions of symbols S0 through S47. The coded versions include complex conjugates of alternate symbols (e.g., even-numbered symbols S0, S2, . . . , etc.) and complex conjugates with sign changed of other than the alternate symbols (e.g., odd-numbered symbols S1, S3, . . . , etc.). For example, the space time encoding module 202 may generate complex conjugates S0* through S47* of symbols S0 through S47, respectively. Additionally, the space time encoding module 202 may change sign of every alternate complex conjugate symbol (e.g., every odd-numbered complex conjugate symbol S1*, S3*, . . . , and S47*). Thus, the space time encoding module 202 may generate complex conjugates with sign changed (e.g., (−S1*), (−S3*), . . . , and (−S47*)).

The symbol selection module 204 selects first N adjacent symbols, where N is the number of transmit antennas. For example, when N=2, the symbol selection module 204 selects symbols S0 and S1. The antenna and subcarrier selection module 206 selects a first subcarrier (e.g., subcarrier 0). The antenna and subcarrier selection module 206 selects a first of the N antennas (e.g., antenna 0 when N=2) and maps symbol S0 onto the first subcarrier and the first antenna (e.g., subcarrier 0 and antenna 0). The antenna and subcarrier selection module 206 selects a second of the N antennas (e.g., antenna 1 when N=2) and maps symbol S1 onto the first subcarrier and the second antenna (e.g., subcarrier 0 and antenna 1). Thus, the antenna and subcarrier selection module 206 maps the first N adjacent symbols onto the N antennas for transmission over the first subcarrier via the N antennas, respectively.

Subsequently, the symbol selection module 204 selects next N adjacent symbols. For example, when N=2, the symbol selection module 204 selects symbols S2 and S3. The antenna and subcarrier selection module 206 selects a next subcarrier (e.g., subcarrier 1). The antenna and subcarrier selection module 206 selects the first of the N antennas (e.g., antenna 0 when N=2) and maps symbol S2 onto the next subcarrier and the first antenna (e.g., subcarrier 1 and antenna 0). The antenna and subcarrier selection module 206 selects the second of the N antennas (e.g., antenna 1 when N=2) and maps symbol S3 onto the next subcarrier and the second antenna (e.g., subcarrier 1 and antenna 1). Thus, the antenna and subcarrier selection module 206 maps the next N adjacent symbols onto the N antennas for transmission over the next subcarrier via the N antennas, respectively.

The mapping module 200 continues the mapping until the remaining symbols are mapped. For example, the mapping module 200 continues the mapping until symbols S46 and S47 are mapped onto antenna 0 and antenna 1 for transmission over subcarrier 23 via antennas 0 and 1, respectively.

Subsequently, the symbol selection module 204 selects a complex conjugate of an even-numbered one of the first N adjacent symbols and a complex conjugate with sign changed of an odd-numbered one of the first N adjacent symbols. For example, the symbol selection module 204 selects a complex conjugate S0* of the even-numbered symbol S0 and a complex conjugate with sign changed of the odd-numbered symbol S1 (i.e., (−S1*)).

The antenna and subcarrier selection module 206 selects the first subcarrier (e.g., subcarrier 0). The antenna and subcarrier selection module 206 selects the first of the N antennas (e.g., antenna 0 when N=2) and maps symbol (−S1*) onto the first subcarrier and the first antenna (e.g., subcarrier 0 and antenna 0). The antenna and subcarrier selection module 206 selects the second of the N antennas (e.g., antenna 1 when N=2) and maps symbol S0* onto the first subcarrier and the second antenna (e.g., subcarrier 0 and antenna 1). Thus, the antenna and subcarrier selection module 206 maps the complex conjugate of the even-numbered one of the first N adjacent symbols and the complex conjugate with sign changed of the odd-numbered one of the first N adjacent symbols onto the N antennas for transmission over the first subcarrier via the N antennas, respectively.

Thereafter, the symbol selection module 204 selects a complex conjugate of an even-numbered one of the next N adjacent symbols and a complex conjugate with sign changed of an odd-numbered one of the next N adjacent symbols. For example, the symbol selection module 204 selects a complex conjugate S2* of the even-numbered symbol S2 and a complex conjugate with sign changed of the odd-numbered symbol S3 (i.e., (−S3*)).

The antenna and subcarrier selection module 206 selects the next subcarrier (e.g., subcarrier 1). The antenna and subcarrier selection module 206 selects the first of the N antennas (e.g., antenna 0 when N=2) and maps symbol (−S3*) onto the next subcarrier and the first antenna (e.g., subcarrier 1 and antenna 0). The antenna and subcarrier selection module 206 selects the second of the N antennas (e.g., antenna 1 when N=2) and maps symbol S2* onto the next subcarrier and the second antenna (e.g., subcarrier 1 and antenna 1). Thus, the antenna and subcarrier selection module 206 maps the complex conjugate of the even-numbered one of the next N adjacent symbols and the complex conjugate with sign changed of the odd-numbered one of the next N adjacent symbols onto the N antennas for transmission over the next subcarrier via the N antennas, respectively.

The mapping module 200 continues the mapping until the remaining complex conjugates and complex conjugates with sign changed are mapped. For example, the mapping module 200 continues the mapping until symbols (−S47*) and S46* are mapped onto antenna 0 and antenna 1 for transmission over subcarrier 23 via antennas 0 and 1, respectively.

Figure 7B:
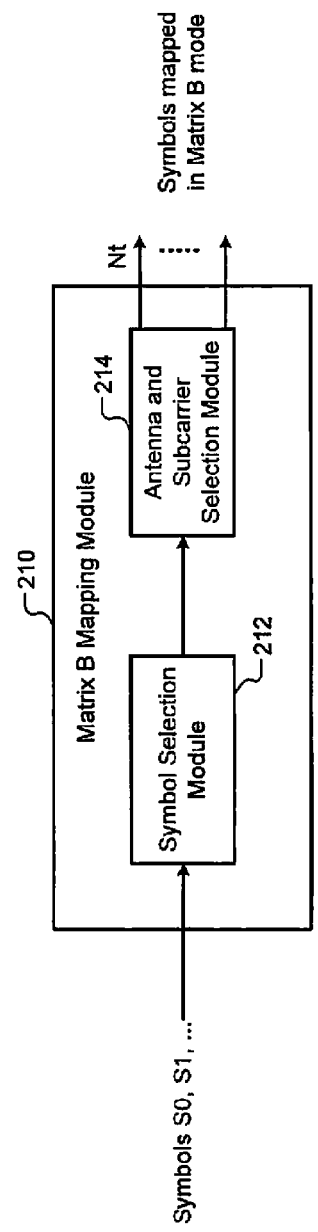
FIG. 7B is a functional block diagram of a mapping module that maps symbols according to the Matrix B mode of FIGS. 2A and 2B.

Referring now to FIG. 7B, a matrix B mapping module 210 (hereinafter mapping module 210) may generate mapping according to the data mapping in Matrix B mode. The mapping module 210 may include a symbol selection module 212 and an antenna and subcarrier selection module 214. The symbol selection module 212 and the antenna and subcarrier selection module 214 may map symbols S0 through S95 over subcarriers 0 through 23 via antenna 0 and antenna 1 as described with reference to FIGS. 2A and 2B. In some implementations, the mapping module 200 may map symbols according to both the new Matrix A mode and the Matrix B mode.

Figure 7C:
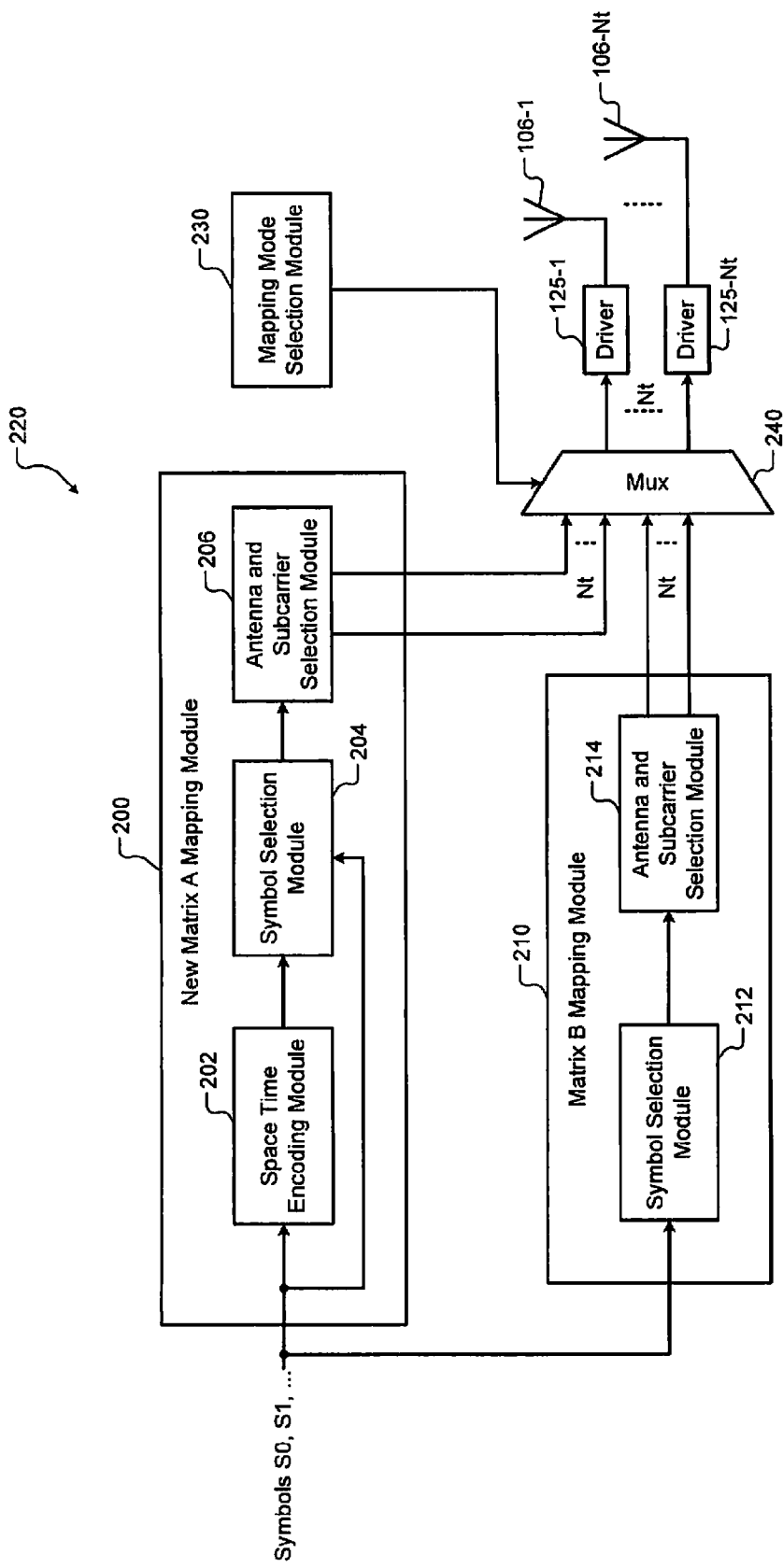
FIG. 7C is a functional block diagram of a transmitter that transmits symbols mapped in the new Matrix A mode of FIG. 6 and the Matrix B mode.

Referring now to FIG. 7C, a transmitter 220 that maps symbols according to the new Matrix A mode and the Matrix B mode is shown. The transmitter 220 may comprise the mapping modules 200, 210, a mapping mode selection module 230, a multiplexer 240, the drivers 125, and the antennas 106. When transmitting, the mapping mode selection module 230 may select the new Matrix A mode or the Matrix B mode. The mapping mode selection module 230 may switch data mapping from the new Matrix A mode to the Matrix B mode and vice versa when transmitting adjacent data slots. For example, the transmitter 220 may transmit a data slot mapped according to the new Matrix A mode to a mobile station (MS). Subsequently, on receiving a request from the MS to retransmit the data slot, the transmitter 220 may retransmit the same data slot mapped according to the Matrix B mode to the MS, or vice versa.

When the mapping mode selection module 230 selects the new Matrix A mode or the Matrix B mode, the mapping mode selection module 230 generates a control signal. Based on the control signal (i.e., based on the mapping mode selected), the multiplexer 240 connects the output of the mapping module 200 or the output of the mapping module 210 to the drivers 125. The drivers 125 drive the antennas 106. The drivers 125 transmit the symbols mapped by the mapping module 200 or by the mapping module 210 via the antennas 106.

To save power, the control signal may also be used to deselect the mapping module 210 or the mapping module 200 when the mapping mode selection module 230 selects the new Matrix A mode or the Matrix B mode, respectively. The deselected mapping module may be partially or completely shutdown by supplying less than normal or no power to the deselected mapping module.

Figure 8A:
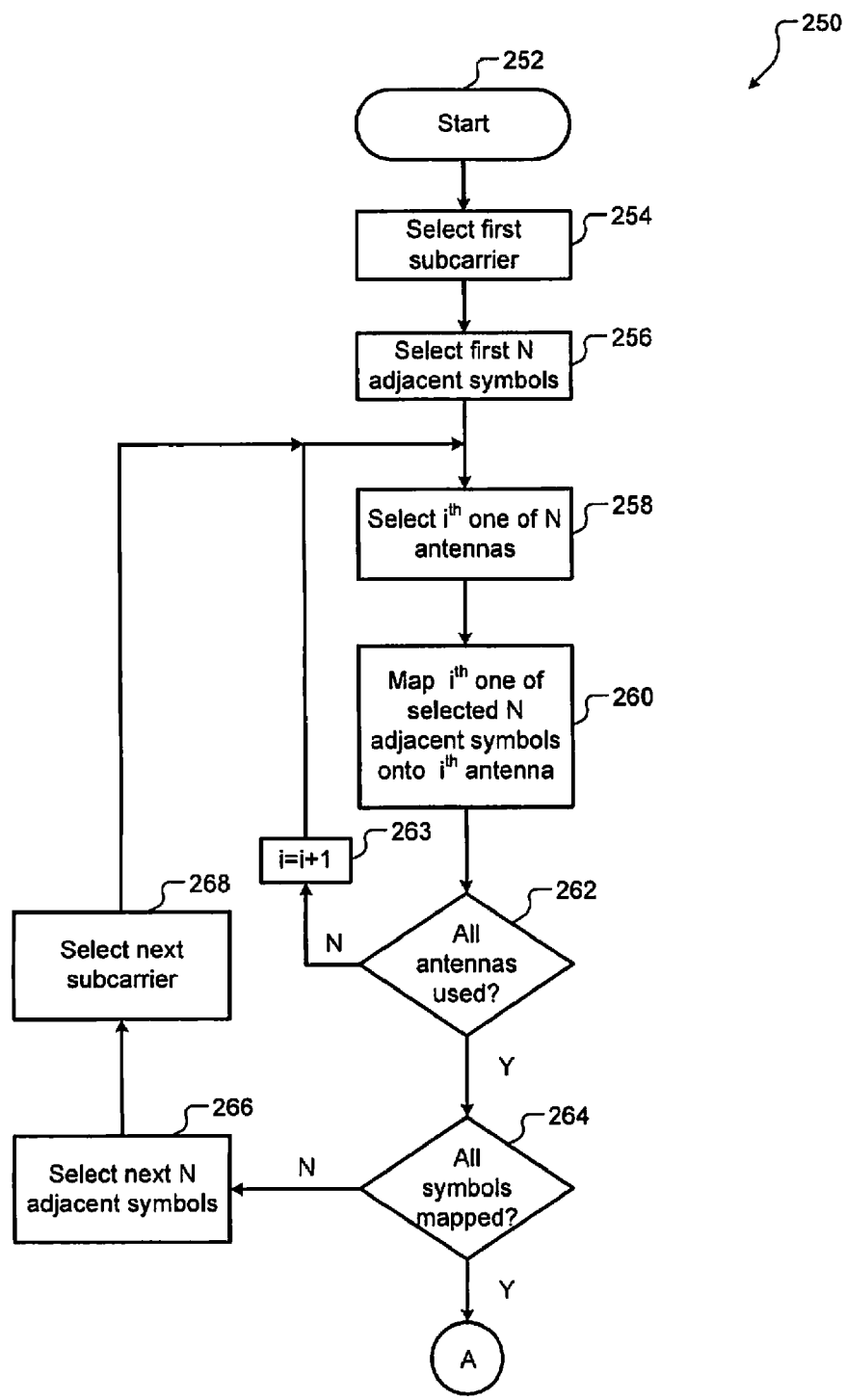
FIGS. 8A and 8B show a flowchart of a method for mapping symbols according to the new Matrix A mode of FIG. 6.
Figure 8B:
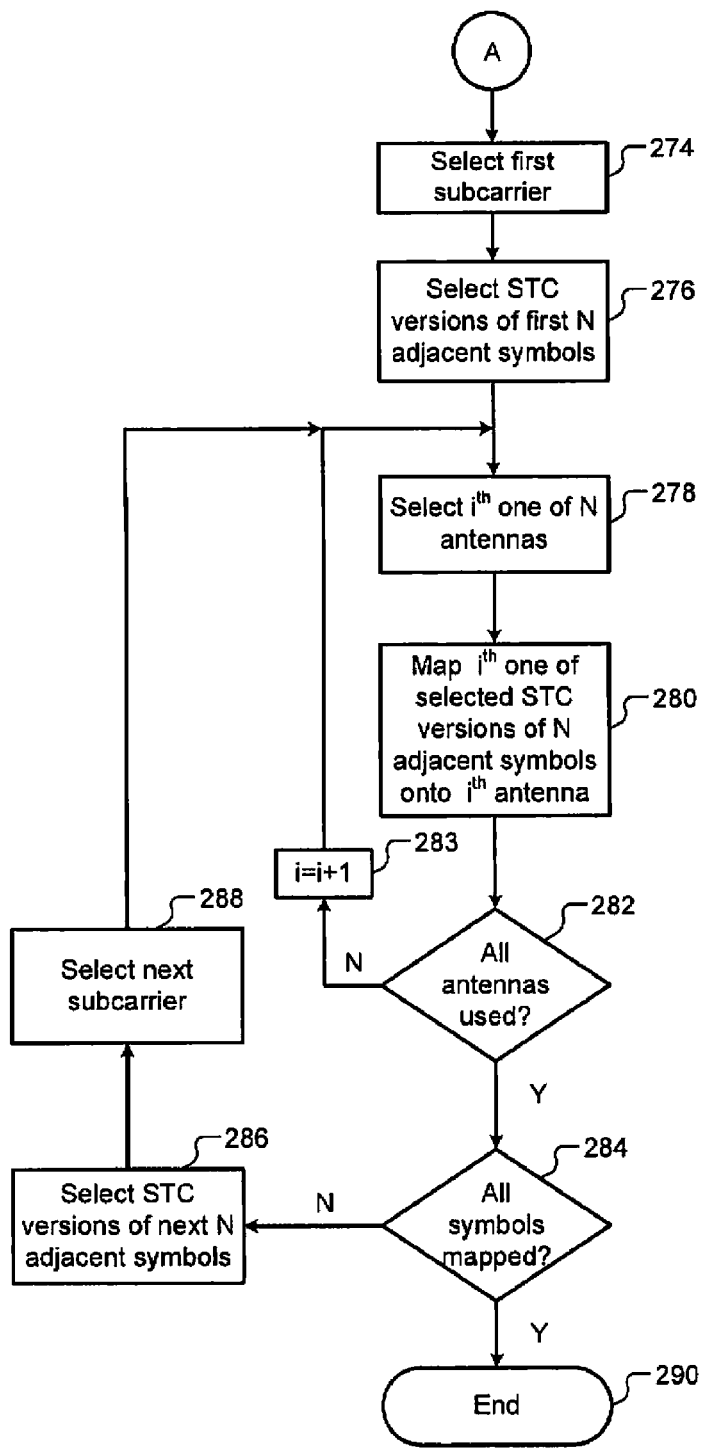

Referring now to FIGS. 8A and 8B, a method 250 for generating the new data mapping in Matrix A mode according to the present disclosure is shown. Control begins in step 252. Control selects a first subcarrier (e.g., subcarrier 0) in step 254. Control selects first N adjacent symbols (e.g., symbols S0 and S1) in step 256. Control selects first one of N antennas (e.g., antenna 0) in step 258. Control maps a first one of the first N adjacent symbols (e.g., symbol S0) onto the first one of the N antennas in step 260.

Control determines in step 262 when the available antennas are exhausted. If the result of step 262 is false (i.e., when some of the antennas are still unused), control selects in step 263 a next one of the N antennas (e.g., antenna 1) and a next one of the first N adjacent symbols (e.g., symbol S1) and repeats steps 258 and 262. If the result of step 262 is true (i.e., when the antennas are exhausted), control determines in step 264 if none of the symbols remains unmapped. If the result of step 264 is false (i.e., when some of the symbols remain unmapped), control selects next N adjacent symbols (e.g., symbols S2 and S3) in step 266, selects a next subcarrier (e.g., subcarrier 1) in step 268, and repeats steps 258 through 264.

If the result of step 264 is true (i.e., when none of the symbols remain unmapped), control selects a first subcarrier (e.g., subcarrier 0) in step 274. Control selects space-time-coded (STC) versions of the first N adjacent symbols (e.g., symbols (−S1*) and S0*) in step 276. Control selects first one of N antennas (e.g., antenna 0) in step 278. Control maps a first one of the STC versions of the first N adjacent symbols (e.g., (−S1*)) onto the first one of the N antennas in step 280.

Control determines in step 282 when the available antennas are exhausted. If the result of step 282 is false (i.e., when some of the antennas are still unused), control selects in step 283 a next one of the N antennas (e.g., antenna 1) and a next one of the STC versions of the first N adjacent symbols (e.g., S0*) and repeats steps 278 and 282. If the result of step 282 is true (i.e., when the antennas are exhausted), control determines in step 284 if none of the STC versions of the symbols remains unmapped. If the result of step 284 is false (i.e., when some of the STC versions of the symbols remain unmapped), control selects STC versions of the next N adjacent symbols (e.g., symbols (−S3*) and S2*) in step 286, selects a next subcarrier (e.g., subcarrier 1) in step 288, and repeats steps 278 through 284. If the result of step 284 is true (i.e., when none of the symbols remain unmapped), control ends in step 290.

Generally, a transmitter of a BS comprising the mapping modules 200, 210 may transmit S symbols over K subcarriers via N antennas using the new data mapping in Matrix A mode, where S, K, and N are integers greater than 1. In some implementations (e.g., single carrier systems), K may be equal to 1. The transmitter of the BS may switch between the new Matrix A mode and the Matrix B mode when transmitting and retransmitting data to a MS. A receiver of the MS may chase combine data mapped using the new Matrix A mode and data mapped using the B mode without increased complexity and/or decreased performance.

Figure 9:
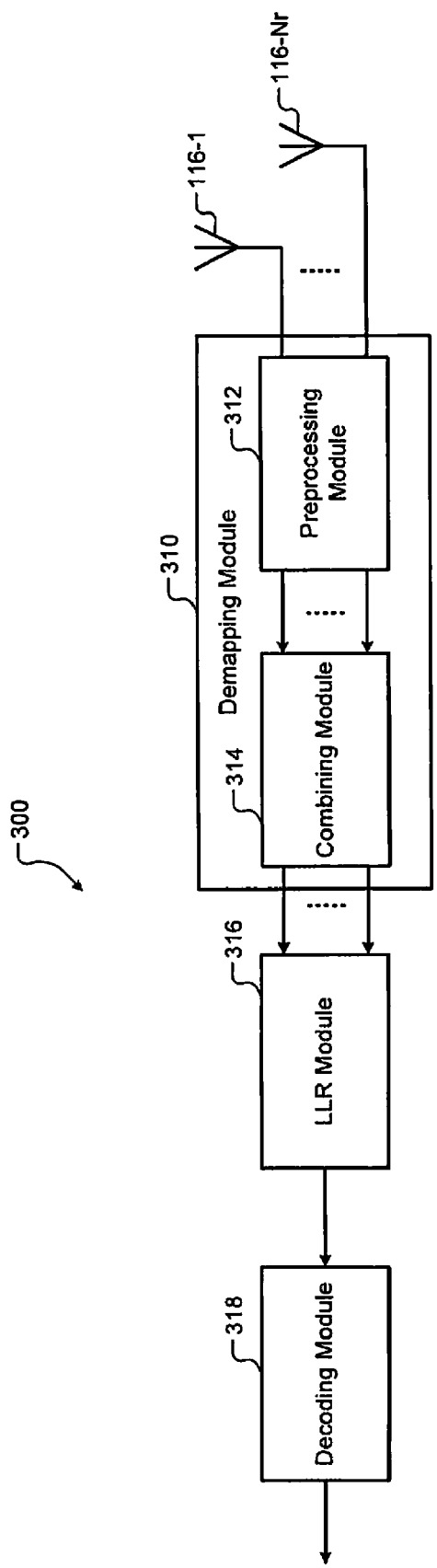
FIG. 9 is a functional block diagram of a receiver that decodes symbols transmitted in the Matrix B mode and retransmitted in the new Matrix A mode or vice versa.

Referring now to FIG. 9, a receiver 300 comprising the antennas 116, a demapping module 310, a LLR module 316, and a decoding module 318 is shown. The demapping module 310 comprises a preprocessing module 312 and a combining module 314. Although not shown, the receiver 300 may additionally comprise a MIMO equalizing module that reduces the inter-stream interference from an output of the demapping module 310.

The demapping module 310 receives data via antennas 116. The data may be mapped according to the new Matrix A mode or the Matrix B mode. The demapping module 310 demaps the data. For example, when the data is mapped according to the new Matrix A mode, the preprocessing module 312 decodes the data. Additionally, the preprocessing module 136 changes the sign of symbols (−S1*), (−S3*), etc. When the data is received in response to HARQ, the combining module 314 combines the data received with previously received data. Additionally, the combining module 314 may combine data received in the same transmission when the data is mapped according to the new Matrix A mode.

The LLR module 316 generates LLRs based on the demapped data generated by the demapping module 310 or based on an equalized demapped data generated by the MIMO equalizing module. The decoding module 318 decodes the demapped data. Additionally, the decoding module 318 comprises a deinterleaver (not shown) that deinterleaves the demapped data. The decoding module 318 generates decoded data for use by a mobile station comprising the receiver 300.

Typically, the receiver 300 includes a low-complexity receiver. The receiver 300 may use HARQ and chase combining for combining data at symbol level without sacrificing performance. For example, when the transmitter 220 transmits to the receiver 300 in the Matrix B mode, the receiver 300 may request retransmission using HARQ if the received data has irrecoverable errors. In response, the transmitter 220 may retransmit the data in the new Matrix A mode, or vice versa. The receiver 300 can sustain performance while chase combining data received in the Matrix B mode and data received in the new Matrix A mode, or vice versa. In other words, the performance of receiver 300 does not decrease when the transmitter 220 switches between the new Matrix A mode and the Matrix B mode when transmitting adjacent data slots to the receiver 300.

The new data mapping in Matrix A mode facilitates chase combining at symbol level without increasing complexity and decreasing performance of the receiver 300. Specifically, the new data mapping simplifies the preprocessing performed by the preprocessing module 312. Additionally, the new data mapping simplifies combining data at symbol level by the combining module 314 when the transmitter 220 uses the new data mapping and switches between the new Matrix A mode and the Matrix B mode when transmitting adjacent data slots to the receiver 300.

The receiver 300 may chase combine data as follows. For example, the receiver 300 may receive data mapped in the Matrix B mode during a first transmission followed by the data that is mapped in the new Matrix A mode during a second transmission. The preprocessing module 312 may receive T adjacent symbols (e.g., symbols S0 and S1) transmitted over a subcarrier (e.g., subcarrier 0) via T antennas (e.g., antenna 0 and antenna 1) during the first transmission, respectively. Additionally, the preprocessing module 312 may receive the T adjacent symbols transmitted over the subcarrier via the T antennas during the second transmission, respectively. The combining module 314 combines the T adjacent symbols transmitted over the subcarrier via the T antennas during the first transmission with corresponding ones of the T adjacent symbols transmitted over the subcarrier via the T antennas during the second transmission. The decoding module 318 decodes the T adjacent symbols based on the combined information generated by the combining module 314.

In some implementations, the receiver 300 may use data received in a data slot mapped using the new Matrix A mode to decode the data without using HARQ. For example, the preprocessing module 312 may receive T adjacent symbols (e.g., symbols S0 and S1) transmitted over a subcarrier (e.g., subcarrier 0) via T antennas (e.g., antenna 0 and antenna 1), respectively. In the same data slot, the preprocessing module 312 may receive space time coded (STC) versions of the T adjacent symbols (e.g., (−S1*) and S0*) transmitted over the subcarrier via the T antennas. The preprocessing module 312 decodes the STC versions of the T adjacent symbols and generates decoded symbols. The combining module 314 combines the decoded symbols and the corresponding ones of the T adjacent symbols. The decoding module 318 decodes the T adjacent symbols based on the combination of the decoded symbols and the T adjacent symbols. Thus, the receiver 300 may not use HARQ when the data received is mapped in the new Matrix A mode.

Figure 10A:
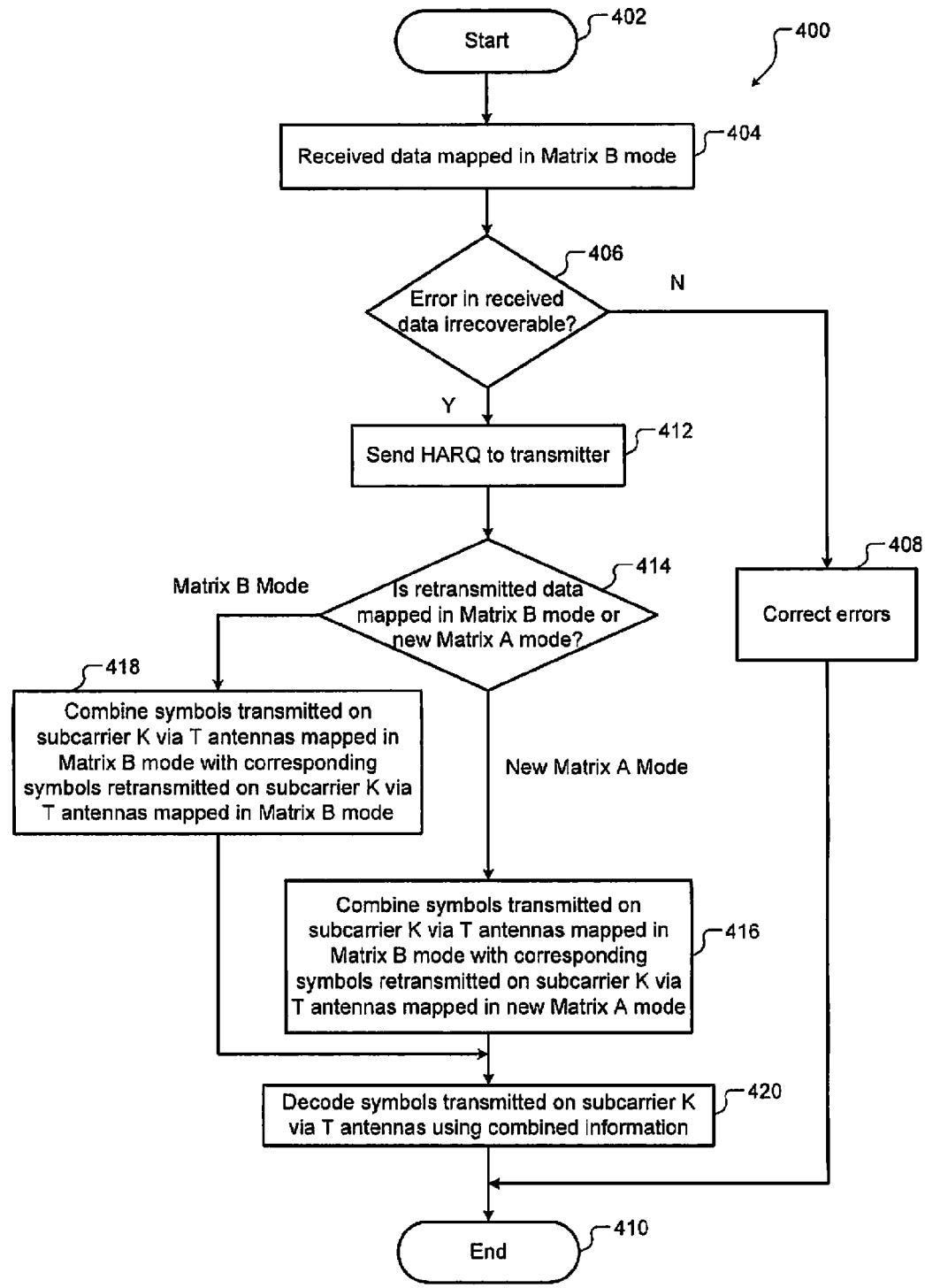
FIG. 10A is a flowchart of a method for decoding symbols when the symbols are transmitted in the Matrix B mode and retransmitted in the new Matrix A mode or vice versa.

Referring now to FIG. 10A, a method 400 for decoding symbols at the receiver 300 when symbols are transmitted in the Matrix B mode and retransmitted in the new Matrix A mode or vice versa is shown. Control begins at step 402. Control receives data mapped in the Matrix B mode during a first transmission in step 404. Control determines in step 406 whether the data has any errors that are irrecoverable. When the result of step 406 is false (i.e., when the errors are recoverable), control corrects errors in step 408, and control ends in step 410.

When the result of step 406 is true (i.e., when the errors are irrecoverable), control sends HARQ to transmitter in step 412. On receiving retransmitted data during a second transmission from the transmitter in response to HARQ, control determines in step 414 whether the retransmitted data is mapped in the Matrix B mode or the new Matrix A mode.

When the retransmitted data is mapped in the new Matrix A mode, control combines symbols in step 416 as follows. Control combines symbols transmitted during the first transmission on subcarrier K via T antennas mapped in the Matrix B mode with corresponding symbols retransmitted during the second transmission on subcarrier K via T antennas mapped in the new Matrix A mode.

Instead, when the retransmitted data is mapped in the Matrix B mode, control combines symbols in step 418 as follows. Control combines symbols transmitted during the first transmission on subcarrier K via T antennas mapped in the Matrix B mode with corresponding symbols retransmitted during the second transmission on subcarrier K via T antennas mapped in the Matrix B mode. At the end of steps 416 or 418, in step 420, control decodes the symbols transmitted on subcarrier K via T antennas based on the combined information generated in steps 416 or 418, respectively.

Figure 10B:
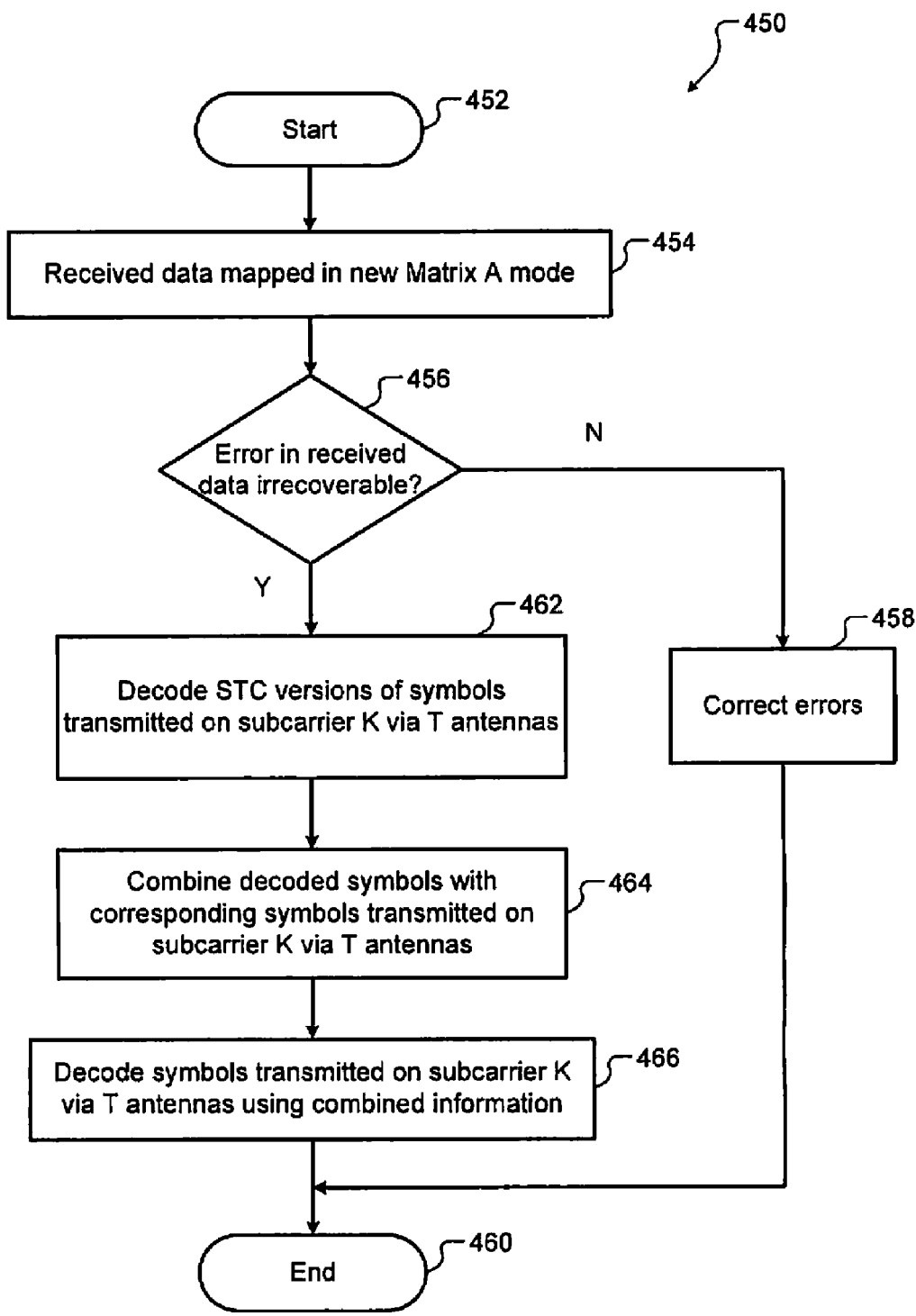
FIG. 10B is flowchart of a method for decoding symbols without using hybrid automatic repeat request (HARQ) when the symbols are transmitted in the new Matrix A mode.

Referring now to FIG. 10B, a method 450 for decoding symbols at the receiver 300 without using HARQ when transmitted symbols are mapped in the new Matrix A mode is shown. Control begins in step 452. Control receives data mapped in the new Matrix A mode in step 454. Control determines in step 456 whether the data has any errors that are irrecoverable. When the result of step 456 is false (i.e., when the errors are recoverable), control corrects errors in step 458, and control ends in step 460.

When the result of step 456 is true (i.e., when the errors are irrecoverable), control decodes STC versions of symbols transmitted on subcarrier K via T antennas and generates decoded symbols in step 462. For example, control decodes (−S1*) and S0* transmitted on subcarrier 0 via antenna 0 and antenna 1, respectively. Control combines in step 464 the decoded symbols with corresponding symbols transmitted on subcarrier K via T antennas. For example, control combines the decoded symbols generated by decoding (−S1*) and S0* with the symbols S1 and S0 transmitted on subcarrier 0 via antenna 1 and antenna 0, respectively. In step 466, control decodes the symbols transmitted on subcarrier K via T antennas based on the combined information generated in step 456. Control ends in step 460.

Mathematically, the new data mapping can be explained as follows. For example only, let the number of transmit antennas be equal to two, and let the number of receive antennas be equal to two. Let the number of data slots chase combined be equal to two. Let each data slot include 96 data symbols denoted as S0, S1, . . . , and S95.

Let $r_A$ denote the number of times a data slot is transmitted using the data mapping in Matrix A mode. Let $r_B$ denote the number of times a data slot is transmitted using the data mapping in Matrix B mode. In other words, the 96 data symbols are transmitted $(r_A+r_B)$ times. Accordingly, the number of received signals is $(r_A+r_B)$.

For example only, let the data symbols be modulated using quadrature phase shift keying (QPSK) modulation. Let a data symbol $s_i$ have one of M values, where $0 \leq i \leq 95$, and M is an integer greater than 1. For example, M=4.

When data is transmitted using the mapping in Matrix A mode, the received signal at subcarrier 0 may be represented by the following equation:

$$\begin{bmatrix} y_{0,e} \\ y_{1,e} \\ y_{0,o} \\ y_{1,o} \end{bmatrix} = \begin{bmatrix} h_{00,e} & h_{01,e} & 0 & 0 \\ h_{10,e} & h_{11,e} & 0 & 0 \\ 0 & 0 & h_{00,o} & h_{01,o} \\ 0 & 0 & h_{10,o} & h_{11,o} \end{bmatrix} \begin{bmatrix} s_0 \\ s_{24} \\ -s_{24}^* \\ s_0^* \end{bmatrix}$$

$$= \begin{bmatrix} H^e & 0 \\ 0 & H^o \end{bmatrix} \begin{bmatrix} s_0 \\ s_{24} \\ -s_{24}^* \\ s_0^* \end{bmatrix}$$

$$y_0(A) = \begin{bmatrix} H^e \\ H^o \end{bmatrix} \begin{bmatrix} s_0 \\ s_{24} \end{bmatrix} = H_0 \begin{bmatrix} s_0 \\ s_{24} \end{bmatrix}$$

where noise is disregarded for simplicity. $y_{0,e}$ denotes a signal received via antenna 0 for even symbol. $y_{1,e}$ denotes a signal received via antenna 1 for even symbol. $y_{0,o}$ denotes a signal received via antenna 0 for odd symbol. $y_{1,o}$ denotes a signal received via antenna 1 for odd symbol. $s_0$ denotes a signal transmitted via antenna 0 for even symbol. $s_{24}$ denotes a signal transmitted via antenna 1 for even symbol. $(-s_{24}^*)$ denotes a signal transmitted via antenna 0 for odd symbol. $s_0^*$ denotes a signal transmitted via antenna 1 for odd symbol.

As shown in the equation, the received signals are represented as a linear transformation of the transmit signals, where a matrix performs the linear transformation. The matrix can be reordered and simplified, and the received signals can be represented in a simplified form as shown. In the simplified form, $y_0(A)$ denotes an equivalent received signal vector at subcarrier 0, where an order of the matrix is 4×1. $H^e$ and $H^o$ denote channel matrices at subcarrier 0 for even and odd symbols, respectively, where the order of the matrices is 2×2. $H_0$ is an equivalent channel matrix at subcarrier 0, where the order of the matrix is 4×2. $H_0$ is generated by the preprocessing module 136.

Thus, when data is transmitted using the mapping in Matrix A mode, a received signal at subcarrier k may be generally represented by the following equation:

$$y_k(A) = H_k \begin{bmatrix} s_k \\ s_{k+24} \end{bmatrix} + n_k$$

where the received signal at subcarrier k includes signals received via antenna 0 and antenna 1 for even and odd symbols. $H_k$ denotes a channel matrix for subcarrier k. The received signal $y_k(A)$ includes symbols $s_k$ and $s_{k+24}$ that are received on subcarrier k via antenna 0 and antenna 1, respectively. $n_k$ denotes a noise vector.

When the data slot is retransmitted (i.e., repeated) $r_A$ times, the received signal comprising the repeatedly transmitted signals (i.e., retransmissions or repetitions) can be represented by the following equation:

$$y_k^{1,2,\ldots r_A}(A) = \begin{bmatrix} H_k^1 \\ H_k^2 \\ \ldots \\ H_k^{r_A} \end{bmatrix} \begin{bmatrix} s_k \\ s_{k+24} \end{bmatrix} + n_k^{1,2,\ldots r_A}$$

$$= H_k^{allrep} \begin{bmatrix} s_k \\ s_{2k+24} \end{bmatrix} + n_k^{1,2,\ldots r_A}$$

In the equation, $y_k^{1,2,\ldots r_A}(A)$ denotes an equivalent received signal vector at subcarrier k, where the order of the matrix is $(4r_A \times 1)$. $H_k^{allrep}$ denotes a channel matrix for all repetitions (i.e., for all retransmissions) at subcarrier k, where the order of the matrix is $(4r_A \times 2)$.

Similarly, when the data is mapped using the Matrix B mode and is retransmitted (i.e., repeated) $r_B$ times, the received signal comprising the repeatedly transmitted signals (i.e., retransmissions or repetitions) can be represented by the following equation:

$$y_k^{1,2,\ldots r_B}(B) = \begin{bmatrix} G_k^1 \\ G_k^2 \\ \ldots \\ G_k^{r_B} \end{bmatrix} \begin{bmatrix} s_{2k} \\ s_{2k+1} \end{bmatrix} + n_k^{1,2,\ldots r_B}$$

$$= G_k^{allrep} \begin{bmatrix} s_{2k} \\ s_{2k+1} \end{bmatrix} + n_k^{1,2,\ldots r_B}$$

In the equation, $y_k^{1,2,\ldots r_B}(B)$ denotes an equivalent received signal vector at subcarrier k, where the order of the matrix is $(2r_B \times 1)$. $G_k^{allrep}$ denotes a channel matrix for all repetitions (i.e., all retransmissions) at subcarrier k, where the order of the matrix is $(2r_B \times 2)$.

When retransmitted data mapped using only Matrix A mode or only Matrix B mode are combined at the receiver, the receiver complexity in chase combining the received data can be analyzed as follows. Regardless of the data mapping used, the received signal can be represented generally by the equation $\underline{y}=H\underline{s}+\underline{n}$, where $\underline{y}$ denotes a receive signal matrix, H denotes the channel matrix, $\underline{s}$ denotes a symbol matrix, $\underline{n}$ denotes a noise vector, and underlines denote vector quantities. Sizes of H and $\underline{y}$ matrices determine the amount of memory used for processing the received signals. Size of $\underline{s}$ matrix determines the receiver complexity.

When data mapped using the mapping in Matrix A mode is retransmitted $r_A$ times and the retransmissions (i.e., repetitions) are chase combined at the receiver, the sizes of H, y, and s matrices for each symbol pair are $(4r_A \times 2)$, $(4r_A \times 1)$, and $(2 \times 1)$, respectively. The received signals are demodulated and decoded to derive the received symbols. For example only, a maximum likelihood (ML) decoding may be used. When ML decoding is used to decode the received symbols, $M^2$ searches are performed for decoding each symbol pair. Accordingly, the receiver complexity is expressed as $M^2$ per symbol pair. Thus, for all 96 data symbols, the sizes of H, y, and s matrices are $48*(4r_A \times 2)$, $48*(4r_A \times 1)$, and $48*(2 \times 1)$, respectively. The receiver complexity is $48*M^2$ since $48*M^2$ searches are performed.

When data mapped using the mapping in Matrix B mode is retransmitted $r_B$ times and the retransmissions (i.e., repetitions) are chase combined at the receiver, the sizes of H, y, and s matrices for each symbol pair are $(2r_B \times 2)$, $(2r_B \times 1)$, and $(2 \times 1)$, respectively. When ML is used to decode the received symbols, $M^2$ searches are performed for decoding each symbol pair. Accordingly, the receiver complexity is expressed as $M^2$ per symbol pair. Thus, for all 96 data symbols, the sizes of H, y, and s matrices are $48*(2r_B \times 2)$, $48*(2r_B \times 1)$, and $48*(2 \times 1)$, respectively. The receiver complexity is $48*M^2$ since $48*M^2$ searches are performed.

Thus, when retransmitted data mapped using only Matrix A mode or only Matrix B mode are chase combined at the receiver, the receiver complexity is unchanged. In some receiver implementations, when data mapped using the mapping in Matrix A mode is retransmitted $r_A$ times and the retransmissions (i.e., repetitions) are chase combined at the receiver, the H and y matrices may be compressed to sizes $(2r_A \times 2)$ and $(2r_A \times 1)$ respectively. Accordingly, the amount of memory used for processing the received signals may be reduced. For example, the H and y matrices may be compressed when the receiver uses maximum ratio combining (MRC) ML decoding.

On the other hand, when retransmitted data mapped using Matrix A mode and Matrix B mode are chase combined at the receiver, the receiver complexity in chase combining the received data can be analyzed as follows. When data transmitted $r_A$ times using the mapping in Matrix A mode and $r_B$ times using the mapping in Matrix B mode is chase combined at the receiver, the received signals for all data symbols and the combined received signal $y^{all}$ can be expressed as follows:

$$y^{1,2,\ldots r_A}(A) = H^{allrep}s + n^{1,2,\ldots r_A}$$

$$y^{1,2,\ldots r_B}(B) = G^{allrep}s + n^{1,2,\ldots r_B}$$

$$y^{all} = \begin{bmatrix} H^{allrep} \\ G^{allrep} \end{bmatrix} s + n$$

In the equation for $y^{all}$, $H^{allrep}$ is a column-reordered version of a block diagonal matrix. The column-reordering is performed to concatenate equivalent channel matrices of the received data mapped using Matrix A and Matrix B modes. Additionally, $G^{allrep}$ is a block diagonal matrix. The matrices $H^{allrep}$ and $G^{allrep}$ are expressed by following equations:

$$H^{allrep} = col-reordered \begin{pmatrix} H_0^{allrep} & 0 & \ldots & 0 \\ 0 & H_1^{allrep} & \ldots & 0 \\ \ldots & \ldots & \ldots & 0 \\ 0 & \ldots & 0 & H_{47}^{allrep} \end{pmatrix}$$

$$G^{allrep} = \begin{pmatrix} G_0^{allrep} & 0 & \ldots & 0 \\ 0 & G_1^{allrep} & \ldots & 0 \\ \ldots & \ldots & \ldots & 0 \\ 0 & \ldots & 0 & G_{47}^{allrep} \end{pmatrix}$$

In the example, the size of matrix H is $((96*(2r_A+r_B)) \times 96)$. The size of matrix y is $((96*(2r_A+r_B)) \times 1)$. The size of matrix s is $(96 \times 1)$. Thus, the complexity of the receiver is $M^{96}$, which is extremely high.

When retransmitted data mapped using only Matrix A mode or only Matrix B mode are chase combined at the receiver, the matrix $L^{allrep}$ is a block diagonal matrix. For example, when retransmitted data mapped using only Matrix A mode are chase combined at the receiver, the matrix $L^{allrep}$ is a block diagonal matrix of the order $(2 \times 2)$ after preprocessing. When retransmitted data mapped using only Matrix B mode are chase combined at the receiver, the matrix $L^{allrep}$ is a block diagonal matrix of the order $(2 \times 2)$. Accordingly, decoding at the receiver can be performed by processing two rows at a time, which does not adversely impact complexity of the receiver.

When, however, retransmitted data mapped using Matrix A mode and Matrix B mode are chase combined at the receiver, the matrix $L^{allrep}$ is not a block diagonal matrix. Upon reordering, the matrix $L^{allrep}$ can be a block diagonal matrix. For example, in FIGS. 1A-2B, symbols S0 and S1 received on subcarrier 0 and symbols S24 and S25 received on subcarrier 12 in Matrix B mode may be chase combined with symbols S0 and S24 received on subcarrier 0 and symbols S1 and S25 received on subcarrier 1 in Matrix A mode by rearranging the matrices y, L, and s. Yet, the order of the matrix $L^{allrep}$ upon reordering can be $(4 \times 4)$ at best. Accordingly, decoding at the receiver may be performed by processing four rows at a time, which increases complexity and/or decreases performance of the receiver. The receiver complexity can be $24*M^4$ when four symbols are paired across Matrix A and Matrix B modes, and four rows are processed at a time.

The receiver complexity can be reduced when data transmitted using the new data mapping in Matrix A mode is chase combined at the receiver with the data retransmitted using the data mapping in Matrix B mode, or vice versa. The receiver complexity is reduced since the matrix $L^{allrep}$ is a block diagonal matrix of the order $(2 \times 2)$ when the new data mapping shown in FIG. 6 is used. The matrix $L^{allrep}$ is a block diagonal matrix of the order $(2 \times 2)$ because the new data mapping shown in FIG. 6 is compatible with the data mapping in Matrix B mode.

When data is transmitted using the new data mapping in Matrix A mode, the received signal at subcarrier k used for transmitting symbols $s_{2k}$ and $s_{2k+1}$ can be expressed by the following equation:

$$y_k^{1,2,\ldots r_A}(A) = \begin{bmatrix} H_k^1 \\ H_k^2 \\ \ldots \\ H_k^{r_A} \end{bmatrix} \begin{bmatrix} s_{2k} \\ s_{2k+1} \end{bmatrix} + n_k^{1,2,\ldots r_A}$$

$$= H_k^{allrep} \begin{bmatrix} s_{2k} \\ s_{2k+1} \end{bmatrix} + n_k^{1,2,\ldots r_A}$$

Accordingly, when retransmitted data mapped using the new data mapping in Matrix A mode and the data mapping in Matrix B mode are chase combined at the receiver, the combined received signal $y^{all}$ can be expressed as follows:

$$y^{all} = L^{allrep} s + n$$

where $$L^{allrep} = \begin{pmatrix} H_0^{allrep} & 0 & \ldots & 0 \\ G_0^{allrep} & 0 & \ldots & 0 \\ 0 & H_1^{allrep} & \ldots & 0 \\ 0 & G_1^{allrep} & \ldots & 0 \\ \ldots & \ldots & \ldots & \ldots \\ \ldots & \ldots & \ldots & \ldots \\ 0 & \ldots & 0 & H_{47}^{allrep} \\ 0 & \ldots & 0 & G_{47}^{allrep} \end{pmatrix}$$

is a block diagonal matrix of the order (2×2).

Accordingly, decoding at the receiver can be performed by processing two rows at a time, and the complexity of the receiver is reduced from $M^{96}$ or $24*M^4$ to $48*M^2$. For example, in FIG. 6, symbols S0 and S1 received on subcarrier 0 during a transmission in Matrix B mode may be chase combined with symbols S0 and S1 received on subcarrier 0 during a retransmission in the new Matrix A mode. Thus, the complexity of the receiver is unchanged when data transmitted using the Matrix B mode and the data retransmitted using the new data mapping in Matrix A mode are chase combined, or vice versa. In other words, the receiver can chase combine data retransmitted by the transmitter using data mappings in different modes without increased complexity or decreased performance.

The teachings of the present disclosure can be used in other systems. For example, the teachings can be used in systems that do not use space time codes (STC) and instead use non-space-time-coded signals. Further, the new data mapping may be used to map data over time and antennas only (e.g., in single-carrier systems) or to map data over frequency and antennas only. For example, the new data mapping may be used when data symbols are mapped onto the transmit antennas using space frequency codes (SFC).

Referring now to FIG. 11, an example of the new data mapping in Matrix A mode using SFC is shown along with the data mapping in Matrix B mode. As shown, T adjacent symbols (e.g., s0 and s1) are mapped over T antennas for transmission over a first subcarrier (e.g., subcarrier 0), where T is the number of antennas (e.g., T=2). Coded versions of the T adjacent symbols generated using SFC (e.g., (−s1*) and S0*) are mapped for transmission over a second subcarrier (e.g., subcarrier 1) that is adjacent to the first subcarrier. The new data mapping in Matrix A mode using SFC is described in more detail below.

Figure 12A:
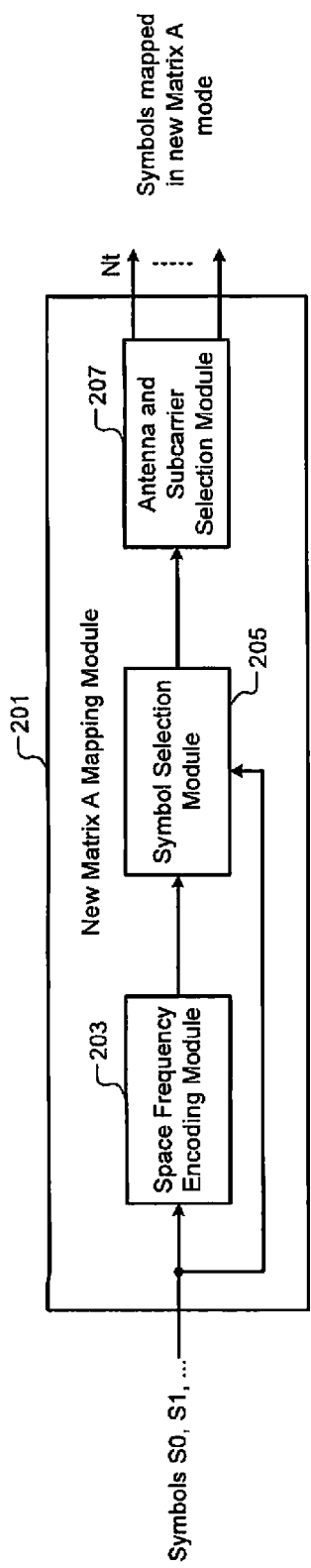
FIG. 12A is a functional block diagram of a mapping module that maps symbols according to the new Matrix A mode of FIG. 11.
Figure 12B:
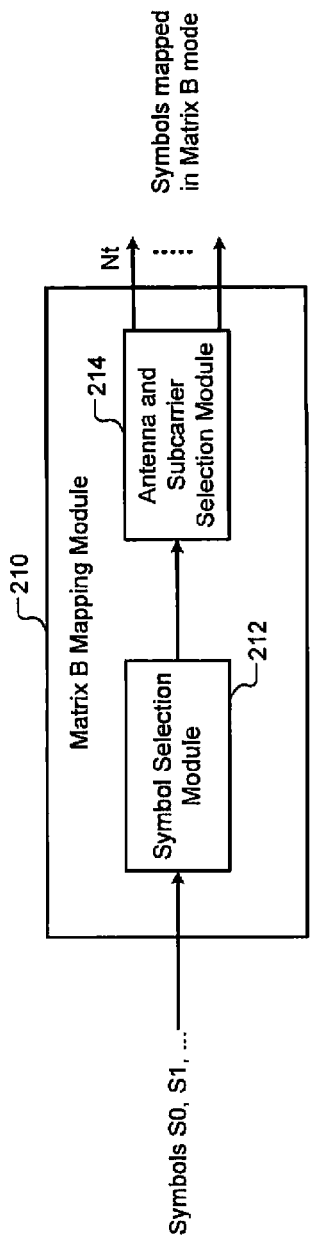
FIG. 12B is a functional block diagram of a mapping module that maps symbols according to the Matrix B mode of FIGS. 2A and 2B.
Figure 12C:
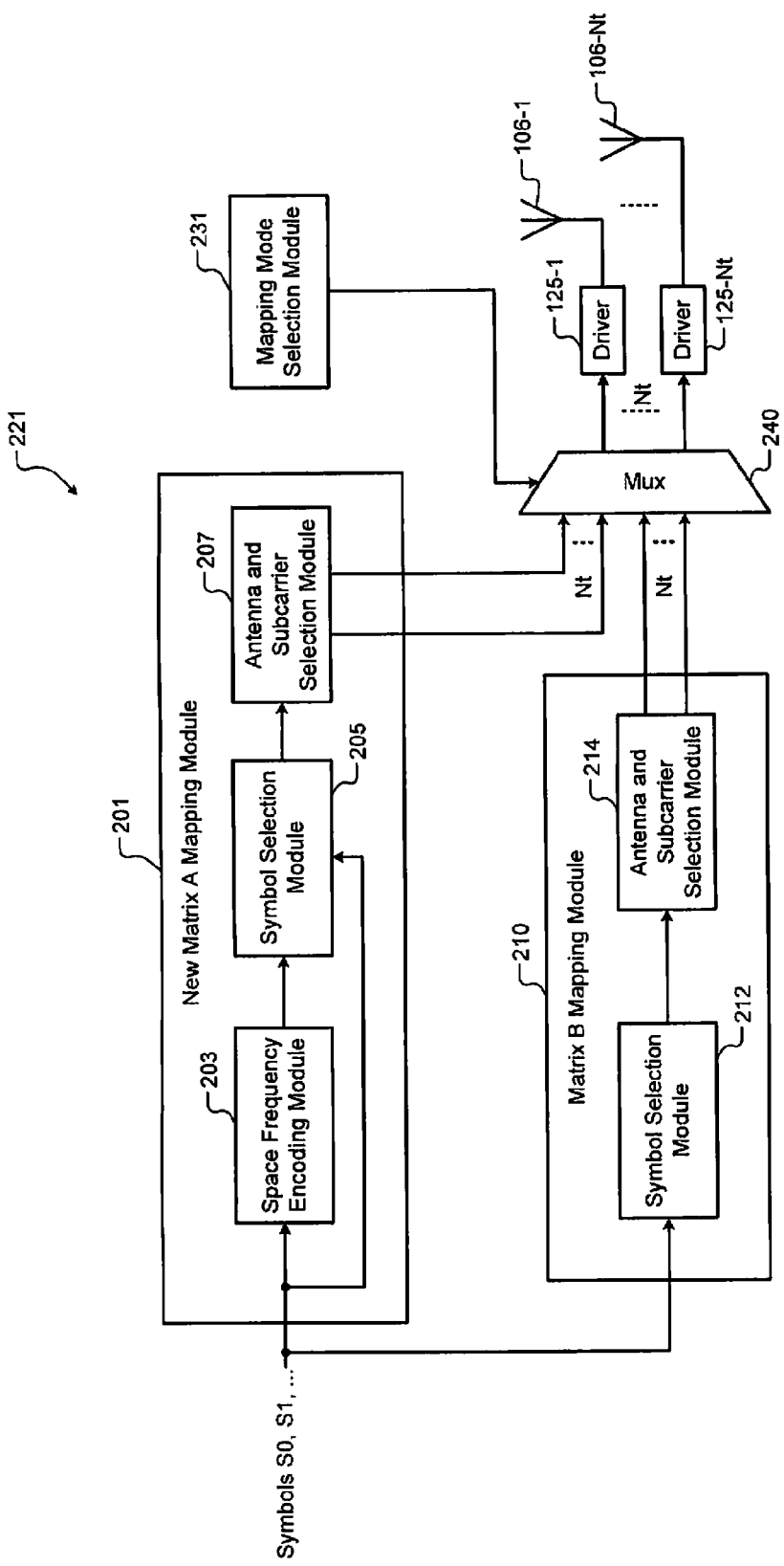
FIG. 12C is a functional block diagram of a transmitter that transmits symbols mapped in the new Matrix A mode of FIG. 11 and the Matrix B mode.

Referring now to FIGS. 12A-12C, a new matrix A mapping module 201 (hereinafter mapping module 201) generates the new data mapping in Matrix A mode using SFC. The mapping module 201 comprises a space frequency encoding module 203, a symbol selection module 205, and an antenna and subcarrier selection module 207.

The space frequency encoding module 203 encodes symbols S0 through S47, for example, using space frequency codes (SFC) and generates coded versions of symbols S0 through S47. The coded versions include complex conjugates of alternate symbols (e.g., even-numbered symbols S0, S2, . . . , etc.) and complex conjugates with sign changed of other than the alternate symbols (e.g., odd-numbered symbols S1, S3, . . . , etc.). For example, the space frequency encoding module 203 may generate complex conjugates S0* through S47* of symbols S0 through S47, respectively. Additionally, the space frequency encoding module 203 may change sign of every alternate complex conjugate symbol (e.g., every odd-numbered complex conjugate symbol S1*, S3*, . . . , and S47*). Thus, the space frequency encoding module 203 may generate complex conjugates with sign changed (e.g., (−S1*), (−S3*), . . . , and (−S47*)).

The symbol selection module 205 selects first N adjacent symbols, where N is the number of transmit antennas. For example, when N=2, the symbol selection module 205 selects symbols S0 and S1. The antenna and subcarrier selection module 207 selects a first subcarrier (e.g., subcarrier 0). The antenna and subcarrier selection module 207 selects a first one of the N antennas (e.g., antenna 0 when N=2) and maps symbol S0 onto the first subcarrier and the first antenna (e.g., subcarrier 0 and antenna 0). The antenna and subcarrier selection module 207 selects a second one of the N antennas (e.g., antenna 1 when N=2) and maps symbol S1 onto the first subcarrier and the second antenna (e.g., subcarrier 0 and antenna 1). Thus, the antenna and subcarrier selection module 207 maps the first N adjacent symbols onto the N antennas for transmission over the first subcarrier via the N antennas, respectively.

Subsequently, the symbol selection module 205 selects the complex conjugate and the complex conjugate with sign changed of the first N adjacent symbols. For example, when N=2, the symbol selection module 205 selects symbols S0* and (−S1)*. More specifically, the symbol selection module 205 selects a complex conjugate of an even-numbered one of the first N adjacent symbols and a complex conjugate with sign changed of an odd-numbered one of the first N adjacent symbols. For example, the symbol selection module 205 selects a complex conjugate S0* of the even-numbered symbol S0 and a complex conjugate with sign changed of the odd-numbered symbol S1 (i.e., (−S1*)).

The antenna and subcarrier selection module 207 selects a next subcarrier (e.g., subcarrier 1) that is adjacent to the first subcarrier. The antenna and subcarrier selection module 207 selects the first one of the N antennas (e.g., antenna 0 when N=2) and maps symbol (−S1*) onto the next subcarrier and the first antenna (e.g., subcarrier 1 and antenna 0). The antenna and subcarrier selection module 207 selects the second one of the N antennas (e.g., antenna 1 when N=2) and maps symbol S0* onto the next subcarrier and the second antenna (e.g., subcarrier 1 and antenna 1). Thus, the antenna and subcarrier selection module 207 maps the complex conjugate and the complex conjugate with sign changed of the first N adjacent symbols onto the N antennas for transmission over the next subcarrier via the N antennas, respectively.

The mapping module 201 continues the mapping for the remaining subcarriers. For example, the mapping module 201 continues the mapping until symbols (−S23*) and S22* are mapped onto antenna 0 and antenna 1 for transmission over subcarrier 23 via antennas 0 and 1, respectively.

Subsequently, the mapping module 201 repeats the process described above for symbols S24 through S47. For example, the mapping module 201 maps symbols S24 and S25 onto antenna 0 and antenna 1 for transmission over subcarrier 0 via antennas 0 and 1, respectively. Thereafter, the mapping module 201 maps symbols (−S25*) and S24* onto antenna 0 and antenna 1 for transmission over subcarrier 1 via antennas 0 and 1, respectively, and so on. The mapping module 201 continues the mapping until symbols (−S47*) and S46* are mapped onto antenna 0 and antenna 1 for transmission over subcarrier 23 via antennas 0 and 1, respectively, as shown in FIG. 11.

Referring now to FIG. 12B, the matrix B mapping module 210 maps symbols according to the data mapping in Matrix B mode as described with respect to FIG. 7B.

Referring now to FIG. 12C, a transmitter 221 that maps symbols according to the new Matrix A mode and the Matrix B mode is shown. The transmitter 221 may comprise the mapping modules 201, 210, a mapping mode selection module 231, the multiplexer 240, the drivers 125, and the antennas 106. When transmitting, the mapping mode selection module 231 may select the new Matrix A mode or the Matrix B mode. The mapping mode selection module 231 may switch data mapping from the new Matrix A mode to the Matrix B mode and vice versa when transmitting adjacent data slots. For example, the transmitter 221 may transmit a data slot mapped according to the new Matrix A mode to a mobile station (MS). Subsequently, on receiving a request from the MS to retransmit the data slot, the transmitter 221 may retransmit the same data slot mapped according to the Matrix B mode to the MS, or vice versa.

When the mapping mode selection module 231 selects the new Matrix A mode or the Matrix B mode, the mapping mode selection module 231 generates a control signal. Based on the control signal (i.e., based on the mapping mode selected), the multiplexer 240 connects the output of the mapping module 201 or the output of the mapping module 210 to the drivers 125. The drivers 125 drive the antennas 106. The drivers 125 transmit the symbols mapped by the mapping module 201 or by the mapping module 210 via the antennas 106.

To save power, the control signal may also be used to deselect the mapping module 210 or the mapping module 201 when the mapping mode selection module 231 selects the new Matrix A mode or the Matrix B mode, respectively. The deselected mapping module may be partially or completely shutdown by supplying less than normal or no power to the deselected mapping module.

Thus, in general, the receiver receives symbols in sets of ($s_{2n}$, $s_{2n+1}$) in both the new Matrix A mode and the Matrix B mode instead of receiving symbols in sets of ($s_{2n}$, $s_{n+24}$) in the Matrix A mode and in sets of ($s_{2n}$, $s_{2n+1}$) in the Matrix B mode. Receiving symbols in sets of ($s_{2n}$, $s_{2n+1}$) in both the new Matrix A mode and the Matrix B mode enables a low-complexity receiver to chase combine symbols received in a retransmission in the new Matrix A mode with the symbols received in the Matrix B mode without degrading performance of the receiver.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
an encoding module
that receives symbols for transmission over K subcarriers and T antennas,
that encodes the symbols using a space time code, and
that generates space time coded (STC) versions of the symbols, where K and T are integers greater than 1;
a symbol selection module that selects T adjacent ones of the symbols and that selects STC versions of the T adjacent ones of the symbols;
a subcarrier selection module that selects one of the K subcarriers for transmitting
the T adjacent ones of the symbols and
the STC versions of the T adjacent ones of the symbols; and
a mapping module
that maps the T adjacent ones of the symbols onto the T antennas for transmission over the selected one of the K subcarriers, respectively, and
that maps the STC versions of the T adjacent ones of the symbols onto the T antennas for transmission over the selected one of the K subcarriers.

2. The system of claim 1, wherein the mapping module maps the T adjacent ones of the symbols onto the T antennas when the selected one of the K subcarriers is used at a first time, and wherein the mapping module maps the STC versions of the T adjacent ones of the symbols onto the T antennas when the selected one of the K subcarriers is used at a second time.

3. The system of claim 1, wherein the mapping module maps the T adjacent ones of the symbols onto the T antennas in a first order of the T antennas, and maps the STC versions of the T adjacent ones of the symbols onto the T antennas in a second order of the T antennas that is opposite of the first order.

4. The system of claim 1, wherein when one of the T adjacent ones of the symbols is mapped onto a first one of the T antennas, an STC version of the one of the T adjacent ones of the symbols is mapped onto a second one of the T antennas.

5. The system of claim 1, wherein the STC versions of the T adjacent ones of the symbols include complex conjugates of the T adjacent ones of the symbols.

6. The system of claim 1, wherein the symbols include orthogonal frequency division multiplexing (OFDM) symbols, and wherein the T antennas operate as multiple-input multiple-output (MIMO) antennas.

7. A transmitter comprising the system of claim 1 and further comprising:
the T antennas; and
T driver modules that drive the T antennas, respectively,
wherein the T driver modules transmit the T adjacent ones of the symbols over the selected one of the K subcarriers via the T antennas, respectively, and
wherein the T driver modules transmit the STC versions of the T adjacent ones of the symbols over the selected one of the K subcarriers via the T antennas.

8. A system comprising the transmitter of claim 7 and further comprising:
a receiver that includes:
a preprocessing module
that receives the T adjacent ones of the symbols and the STC versions of the T adjacent ones of the symbols transmitted over the one of the K subcarriers, that decodes the STC versions of the T adjacent ones
of the symbols, and
that generates decoded symbols;
a combining module that combines the decoded symbols
and corresponding ones of the T adjacent ones of the
symbols; and
a decoding module that decodes the T adjacent ones of
the symbols based on a combination of
the decoded symbols and
the corresponding ones of the T adjacent ones of the
symbols.

9. A receiver comprising:
a preprocessing module
that receives T adjacent symbols transmitted over a subcarrier via T antennas, respectively, where T is an integer greater than 1,
that receives space time coded (STC) versions of the T adjacent symbols transmitted over the subcarrier via the T antennas,
that decodes the STC versions of the T adjacent symbols, and
that generates decoded symbols;
a combining module that combines the decoded symbols and corresponding ones of the T adjacent symbols; and
a decoding module that decodes the T adjacent symbols based on a combination of
the decoded symbols and
the corresponding ones of the T adjacent symbols.

10. A transmitter comprising:
a control module that selects first and second mapping modes to map symbols onto K subcarriers and T antennas during first and second transmissions of the symbols, respectively, where K and T are integers greater than 1;
a first mapping module that maps T adjacent ones of the symbols onto the T antennas for transmission over one of the K subcarriers, respectively, when the first mapping mode is selected; and
a second mapping module
that maps the T adjacent ones of the symbols onto the T antennas for transmission over the one of the K subcarriers, respectively, and
that maps space time coded (STC) versions of the T adjacent ones of the symbols onto the T antennas for transmission over the one of the K subcarriers when the second mapping mode is selected.

11. The transmitter of claim 10, wherein the second mapping module maps the T adjacent ones of the symbols onto the T antennas, respectively, when the one of the K subcarriers is used at a first time, and wherein the second mapping module maps the STC versions of the T adjacent ones of the symbols onto the T antennas when the one of the K subcarriers is used at a second time that occurs after the first time.

12. The transmitter of claim 10 wherein:
the T adjacent ones of the symbols are mapped onto the T antennas in a first order of the T antennas in the first and second mapping modes; and
the STC versions of the T adjacent ones of the symbols are mapped onto the T antennas in a second order of the T antennas in the second mapping mode, where the second order is opposite of the first order.

13. The transmitter of claim 10 wherein when one of the T adjacent ones of the symbols is mapped onto a first one of the T antennas in the second mapping mode, an STC version of the one of the T adjacent ones of the symbols is mapped onto a second one of the T antennas.

14. The transmitter of claim 10 wherein the STC versions of the T adjacent ones of the symbols include complex conjugates of the T adjacent ones of the symbols.

15. The transmitter of claim 10 wherein the symbols include orthogonal frequency division multiplexing (OFDM) symbols, and wherein the T antennas operate as multiple-input multiple output (MIMO) antennas.

16. The transmitter of claim 10 further comprising:
the T antennas; and
T driver modules that drive the T antennas, respectively,
wherein the T driver modules transmit the T adjacent ones of the symbols over the one of the K subcarriers via the T antennas, respectively, during the first and second transmissions, and
wherein the T driver modules transmit the STC versions of the T adjacent ones of the symbols over the one of the K subcarriers via the T antennas during the second transmission.

17. A system comprising the transmitter of claim 16 and further comprising:
a receiver that includes:
a preprocessing module that receives the T adjacent ones of the symbols transmitted over the one of the K subcarriers via the T antennas, respectively, during the first and second transmissions;
a combining module that combines
the T adjacent ones of the symbols transmitted over the one of the K subcarriers via the T antennas during the first transmission with
corresponding ones of the T adjacent ones of the symbols transmitted over the one of the K subcarriers via the T antennas during the second transmission; and
a decoding module that decodes the T adjacent ones of the symbols based on a combination of the T adjacent ones of the symbols transmitted over the one of the K subcarriers via the T antennas during the first and second transmissions.

18. A system comprising the transmitter of claim 16 and further comprising:
a receiver that includes:
a preprocessing module
that receives the T adjacent ones of the symbols and the STC versions of the T adjacent ones of the symbols transmitted over the one of the K subcarriers during the second transmission,
that decodes the STC versions of the T adjacent ones of the symbols, and
that generates decoded symbols;
a combining module that combines the decoded symbols and corresponding ones of the T adjacent ones of the symbols; and
a decoding module that decodes the T adjacent ones of the symbols based on a combination of
the decoded symbols and
the corresponding ones of the T adjacent ones of the symbols.

19. A receiver comprising:
a preprocessing module
that receives T adjacent symbols transmitted over a subcarrier via T antennas during a first transmission, respectively, where T is an integer greater than 1, and
that receives the T adjacent symbols and space time coded (STC) versions of the T adjacent symbols transmitted over the subcarrier via the T antennas during a second transmission;

a combining module that combines
the T adjacent symbols transmitted over the subcarrier via the T antennas during the first transmission with corresponding ones of the T adjacent symbols transmitted over the subcarrier via the T antennas during the second transmission; and a decoding module that decodes the T adjacent symbols based on a combination of the T adjacent symbols transmitted over the subcarrier via the T antennas during the first and second transmissions.

* * * * *